(12) United States Patent
Viljoen

(10) Patent No.: US 10,034,070 B1
(45) Date of Patent: Jul. 24, 2018

(54) LOW COST MULTI-SERVER ARRAY ARCHITECTURE

(71) Applicant: Netronome Systems, Inc., Santa Clara, CA (US)

(72) Inventor: J. Niel Viljoen, Cambridge (GB)

(73) Assignee: Netronome Systems, Inc., Santa Clara, CA (US)

( * ) Notice: Subject to any disclaimer, the term of this patent is extended or adjusted under 35 U.S.C. 154(b) by 163 days.

(21) Appl. No.: 14/846,797

(22) Filed: Sep. 6, 2015

(51) Int. Cl.
*H04J 14/00* (2006.01)
*H04Q 11/00* (2006.01)

(52) U.S. Cl.
CPC ..... *H04Q 11/0062* (2013.01); *H04Q 11/0005* (2013.01); *H04Q 2011/0039* (2013.01); *H04Q 2011/0073* (2013.01)

(58) Field of Classification Search
CPC .......... H04Q 11/0062; H04Q 11/0005; H04Q 11/0037; H04Q 2011/0039; H04Q 2011/0073; H04Q 2011/005; H04Q 2011/0054; H04Q 2011/0088
USPC ......................................................... 398/45
See application file for complete search history.

(56) References Cited

U.S. PATENT DOCUMENTS

| | | | | |
|---|---|---|---|---|
| 5,457,691 A | * | 10/1995 | Romeijn | H04J 3/0602 370/510 |
| 8,059,539 B2 | * | 11/2011 | Cochran | H04L 1/24 370/231 |
| 2014/0341568 A1 | * | 11/2014 | Zhang | H04J 14/0212 398/34 |
| 2014/0359044 A1 | * | 12/2014 | Davis | H04L 45/60 709/213 |

* cited by examiner

*Primary Examiner* — M. R. Sedighian
(74) *Attorney, Agent, or Firm* — Imperium Patent Works LLP; T. Lester Wallace; Mark D. Marrello

(57) ABSTRACT

An array of columns and rows of host server devices is mounted in a row of racks. Each device has a host processor and an exact-match packet switching integrated circuit. Packets are switched within the system using exact-match flow tables that are provisioned by a central controller. Each device is coupled by a first cable to a device to its left, by a second cable to a device to its right, by a third cable to a device above, and by a fourth cable to a device below. In one example, substantially all cables that are one meter or less in length are non-optical cables, whereas substantially all cables that are seven meters or more in length are optical cables. Advantageously, each device of a majority of the devices has four and only four cable ports, and connects only to non-optical cables, and the connections involve no optical transceiver.

20 Claims, 16 Drawing Sheets

ARRAY OF HOST SERVER DEVICES DISPOSED IN A ROW OF RACKS

MATRIX OF EXACT-MATCH HOST SERVER DEVICES
WITH LOW COST AND EFFICIENT INTERCONNECTION

ARRAY OF HOST SERVER DEVICES DISPOSED IN A ROW OF RACKS

ARRAY OF HOST SERVER DEVICES

HOST SERVER DEVICE WITH EXACT-MATCH NFX

EXACT-MATCH PACKET SWITCHING
INTEGRATED CIRCUIT
(NFX)

EXACT-MATCH FLOW TABLE STRUCTURE

CHARACTERIZER

| OCTET | RESULT | WIDTH | BITS | DESCRIPTION |
|---|---|---|---|---|
| 0 | TABLE SET | 1 | 0:0 | THE VALUE OF THE "TABLE SET" REGISTER BIT AT THE TIME OF PRESENTATION TO THE PICOENGINE. |
| | SHORT | 1 | 1:1 | INDICATES THE PACKET WAS IN SOME WAY TOO SHORT TO COMPLETE THE DESIRED CHARACTERIZATION. |
| | ERROR | 1 | 2:2 | SET IF A CHARACTERIZATION ERROR OCCURRED. |
| | INNER SHORT | 1 | 3:3 | IF SET, INNER ANALYSIS INDICATED PACKET WAS TOO SHORT FOR ITS INNER PAYLOAD. |
| | USER TYPE | 3 | 6:4 | TAKEN DIRECTLY FROM THE LOGICAL PORT CONFIGURATION. |
| | INNER IN COMPLETE | 1 | 7:7 | SET IF INNER ANALYSIS WAS ATTEMPTED BUT NOT ENOUGH DATA WAS SUPPLIED TO COMPLETE IT (INCOMPLETE IPV4 HEADER, NO BOS IN MPLS, ETC). |
| 1 | OUTER TYPE | 3 | 2:0 | FINAL TYPE OF THE OUTER AND ETHERNET CHARACTERIZATION (BIT 0 INDICATES GFP DONE; BIT 1 INDICATES ETHERNET DONE; BIT 2 INDICATES PPP DONE) |
| | GFP TYPE | 1 | 3:3 | ZERO FOR GFP-F NO EXTENSION, 1 FOR VALID GFP-F WITH LINEAR EXTENSION. |
| | ETH INITIAL TCAM | 1 | 4:4 | IF SET, SKIPPED THE INTIAL TCAM TAG |
| | ETH VLANS | 2 | 6:5 | NUMBER OF VLAN TAGS SKIPPED (0 TO 3) |
| | ETH PBB | 1 | 7:7 | IF SET, THEN ETHERNET PBB WAS ANALYZED |
| 2 | INNER TYPE | 3 | 2:0 | ENCODED INNER PAYLOAD TYPE (0=IPV4, 1=IPV6, 2=MPLS-U, 3=MPLS-M, 4=ARP, 5=FCOE, 6=OTHER) - PRESENTED IN AN 8-BIT FIELD |
| 3 | INNER FLAGS | 8 | 7:0 | FLAGS FROM THE INNER CHARACTERIZATION, SEE THE RELEVANT INNER CHARACTERIZATION SECTION ABOVE |
| 4-7 | PORT | 7 | 31:0 | LOGICAL PORT THAT THE PACKET ARRIVED ON; THIS IS REPLACED BY THE 32-BIT TUNNEL DATA FOR A TUNNELED PACKET MOST SIGNIFICANT BYTE FIRST |
| 8-9 | LENGTH | 16 | 15:0 | PACKET LENGTH FROM MAC (INCLUDES PREPENDS) MOST SIGNIFICANT BYTE FIRST |
| 10-11 | RESERVED | 16 | 15:0 | FIRST 2 OCTETS OF THE ORIGINAL PACKET |
| 12 | OUTER OFFSET | 8 | 7:0 | OFFSET FROM START OF PACKET TO THE OUTER PACKET; THIS IS COPIED FROM THE LOGICAL PORT'S 'SKIP' FIELD OR THE TUNNEL SKIP AMOUNT |
| 13 | ETH PBB | 8 | 7:0 | OFFSET TO ETHERNET FOR GFP-F. THIS IS OUTEROFFSET+8 OR 12 (12 IF EXTENDED) |
| 14 | INNER OFFSET | 8 | 7:0 | OFFSET FROM START OF PACKET TO THE INNER PACKET; ZERO IF INNERTYPE IS OTHER |
| 15 | PAYLOAD OFFSET | 8 | 7:0 | OFFSET FROM START OF PACKET TO THE PAYLOAD OF THE INNER ENCAPSULATION; ZERO IF INNERTYPE IS OTHER |

CHARACTERIZATION VALUE RESULT TABLE

FIG. 9

REDUCE TABLE A

INPUT TO REDUCE TABLE A
(64-BITS)

OUTPUT OF BARREL SHIFTER
(64-BITS)

OUTPUT FROM REDUCE TABLE A
(32-BITS)

FLOW ID
(FOR PACKET TYPE C TO PACKET TYPE B CONVERSION EXAMPLE)

ONE FLOW ENTRY STORED IN ONE ENTRY FIELD OF THE FLOW TABLE

LOW COST MULTI-SERVER ARRAY ARCHITECTURE

TECHNICAL FIELD

The disclosed embodiments relate generally to multi-server arrays that can be realized for low cost.

SUMMARY

A system of host server devices includes a plurality of columns of interconnected host servers devices, where the host server devices for each respective one of the columns is disposed and mounted in a corresponding respective one of a plurality of racks. The racks are disposed side-by-side, in a row. In one example, each of the host server devices is coupled by four networking cables to four other host server devices. A host server device is coupled by a first cable to the host server device immediately to its left in the same row of servers, unless the host server device is disposed in the leftmost rack, in which case it is coupled by the first cable to the rightmost host server device in the same row. The host server device is also coupled by a second cable to the host server device immediately to its right in the same row of servers, unless the host server device is disposed in the rightmost rack, in which case it is coupled by the second cable to the leftmost host server device in the same row. The host server device is also coupled by a third cable to the host server device immediately above it in the same column, unless the host server device is upper-most host server device in the column, in which case it is coupled by the third cable to the bottom-most host server device in the same column. The host server device is also coupled by a fourth cable to the host server device to the host server device immediately below it in the same column of servers, unless the host server device is the bottom-most host server device of the column, in which case it is coupled by the fourth cable to the upper-most host server device in the same column. Not all of the host server devices of the system absolutely must be connected in this way, but it is advantageous if all or almost all of them are.

In the system, all or substantially all of the networking cables that are a predetermined length D, or less, in length are non-optical metal conductor electrical networking cables. All, or substantially all, networking cables that are longer than the predetermined length D are optical networking cables. Substantially all means eighty percent or more. In one example, the predetermined length D is about seven meters, and in another example, the predetermined length D is about one meter.

Due to this arrangement, each host server device of a majority of the host server devices of the system includes: a first cable socket port that is coupled to a first non-optical cable, a second cable socket port that is coupled to a second non-optical cable, a third cable socket port that is coupled to a third non-optical cable, and a fourth cable socket port that is coupled to a fourth non-optical cable. In addition, each host server device of the majority of host server devices does not have any optical transceivers, and does not communicate with any other of the host server devices via any optical networking cable. Advantageously, each host server device of the majority of the host server devices has these characteristics, so the overall cost of providing the system (the system includes the cables) is reduced as compared to what it would be were all inter-server connections made by optical cables.

Each host server device, in addition to having the cable socket ports described above, includes a host processor and a novel exact-match packet switching integrated circuit (NFX). The novel exact-match packet switching integrated circuit includes an exact-match flow table structure. The exact-match flow table structure includes an SRAM (Static Random Access Memory), which in turn stores an exact-match flow table. The exact-match flow table stores flow identifiers (Flow IDs) but does not and cannot store a Flow ID that includes any wildcard identifier, don't care bit, or mask bit. Due to having an exact-match packet switching integrated circuit (NFX), each host server device of the system can: a) receive a packet via one of its first through fourth cable socket ports, b) determine a Flow ID from the packet, c) use the determined Flow ID to perform a lookup operation using its exact-match flow table structure in order to find a Flow ID stored in its exact-match flow table structure that is a bit-for-bit exact match for the determined Flow ID and thereby obtain a result value that is stored in association with the stored Flow ID, and d) use the result value to determine how to output the packet from the host server device. The host server device can do this without using any TCAM (Ternary Content-Addressable Memory) that stores flow entries, without consulting any flow table that stores wildcards, without any instruction-fetching processor performing any software processing on the packet to determine a Flow ID or to determine how to output the packet from the host server device, and without having to forward the packet to any host computer for further processing. Each of the host server devices of the system has an identical copy of the relatively inexpensive "exact-match packet switching integrated circuit" (NFX). The contents of the exact-match flow tables in all of these NFX integrated circuits are controlled and determined exclusively by a central controller of the system. A user of the system uses the central controller to control the flow entries that are in the exact-match flow tables, and thereby to control how flows of packets are switched and communicated within the system.

In one example of the system, none of the host server devices has or maintains a flow table that stores flow entries with wildcards. The host server devices only perform exact-match packet switching. If a packet is received into the system that does not result in an exact match, then the central controller of the system is alerted and the central controller can update the flow tables of the system with flow entries so that handling of packets of this same flow will thereafter result in exact matches and so that packets of this same flow can thereafter pass through the system as desired by the central controller. One or more of the host server devices may have a capacity to perform flow matching using wildcard flow entries, but these host server devices are not programmed to operate this way. This reduces power consumption even though the wildcard flow entry matching circuitry may be present. Ideally, the motherboard portions of the host server devices do not have the TCAM circuitry to support such flow table wildcard matching for an adequately large number of flow entries to support all packet traffic between host server devices within the system. Omitting this hardware from the motherboard portions of the host server devices serves to reduce both system manufacturing cost as well as system power consumption.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 9 is a diagram that sets forth the various parts of a characterization result value.

DETAILED DESCRIPTION

Reference will now be made in detail to some embodiments of the invention, examples of which are illustrated in the accompanying drawings.

Figure 1:
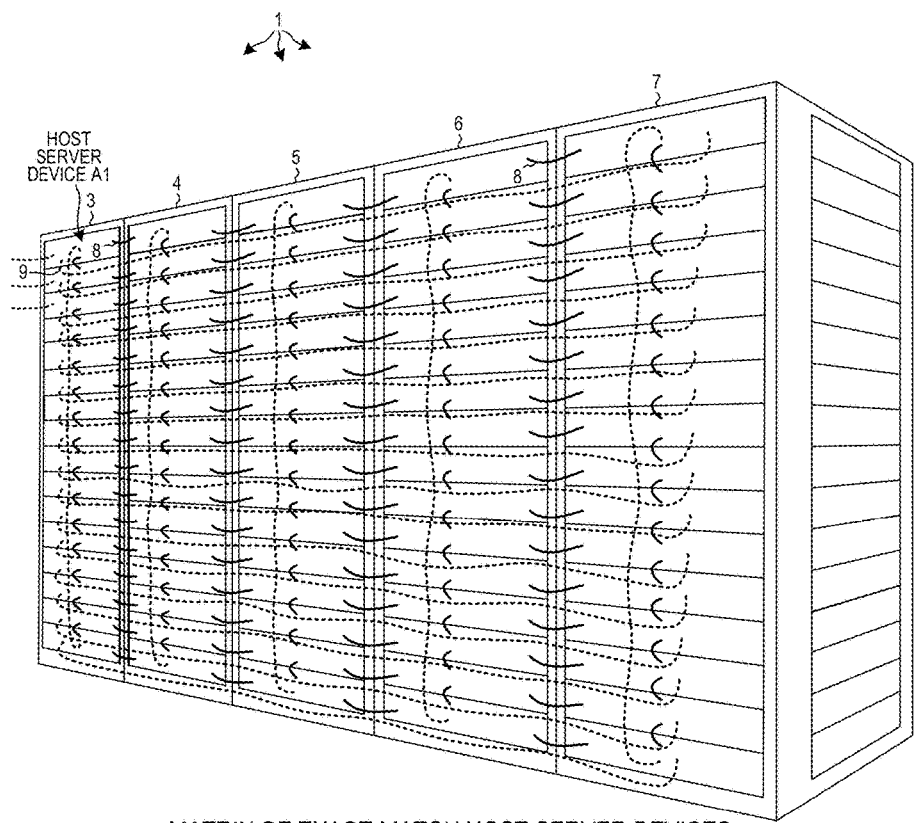
FIG. 1 is a diagram of system of interconnected host server devices, networking cables, and central controller, where the system is disposed in a row of racks. The system is a matrix of exact-match host server devices that has low cost and efficient interconnection between the host server devices.

FIG. 1 is a diagram of a system 1 of eighty interconnected host server devices, a central controller 2, and networking cables, in accordance with one novel aspect. The system 1 includes five columns of host server devices. Each respective column of host server devices is mounted in a corresponding respective one of five racks 3-7. The racks 3-7 are disposed side-by-side in a row as pictured in FIG. 1. This row of racks is, in the present example being described here, part of a much larger data center that has many long rows of racks. Each rack of the system 1 is configured to have a plurality of nineteen inch wide slots. At the bottom of each slot, a pair of horizontally-extending rails is mounted to the vertical support members of the rack. This pair of rails supports the bottom of a host server device that is disposed in the slot. The host server device can be slid into the slot on these rails, and can be slid out of the slot on these rails. In the illustrated example, there are sixteen host server devices, mounted one above the other, in each column. Accordingly, the host server devices are arranged in a two-dimensional matrix of five columns and sixteen rows.

Figure 2A:
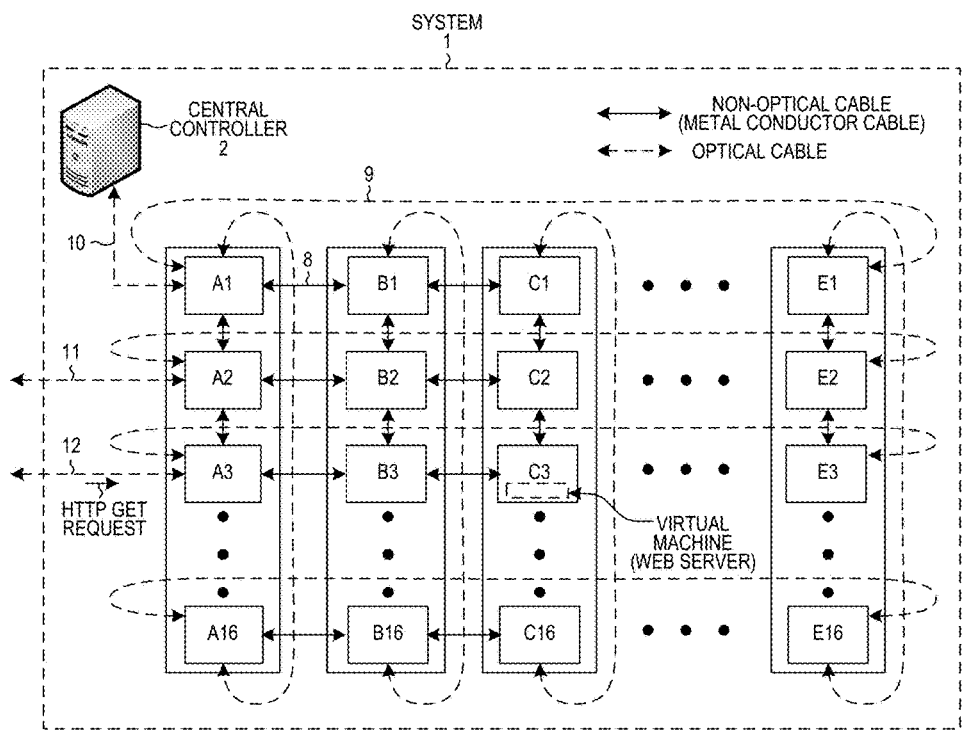
FIG. 2A is a schematic representation of the system of FIG. 1.

FIG. 2A is a schematic representation of the system 1 of FIG. 1. As indicated in FIG. 2A, the host server devices are denoted with reference identifiers A1-A16, B1-B16, C1-C16, D1-D16 and E1-E16. Each of the host server devices is coupled to at least one of the other host server devices by a bidirectional networking cable. The networking cables of the system 1 are either bidirectional optical networking cables that include optical fibers, or are bidirectional passive copper networking cables that include multiple metal wires and no optical transceivers or fibers. Reference numeral 8 identifies a passive copper networking cable that couples host server devices A1 and B1 together. Reference numeral 9 identifies an optical networking cable that couples host server devices A1 and E1 together.

Preferably, and in the specific example illustrated in FIG. 1, each of the host server devices is coupled by four cables to four other host server devices. A host server device is coupled by a first cable to the host server device immediately to its left (in the particular column and row example of FIG. 1) in the same row of servers, unless the host server device is disposed in the leftmost rack, in which case it is coupled by the first cable to the rightmost host server device in the same row. The host server device is also coupled by a second cable to the host server device immediately to its right (in the particular column and row example of FIG. 1) in the same row of servers, unless the host server device is disposed in the rightmost rack, in which case it is coupled by the second cable to the leftmost host server device in the same row. The host server device is also coupled by a third cable to the host server device immediately above it (in the particular column and row example of FIG. 1) in the same column, unless the host server device is top host server device in the column, in which case it is coupled by the third cable to the bottom-most host server device in the same column. The host server device is also coupled by a fourth cable to the host server device to the host server device immediately below it (in the particular column and row example of FIG. 1) in the same column of servers, unless the host server device is the bottom-most host server device of the column, in which case it is coupled by the fourth cable to the upper-most host server device in the same column.

FIG. 2A is a diagram that shows the two-dimensional array of host server devices of system 1 in schematic form. In addition to the four cable connections mentioned above, the host server device A1 in the left-most column is coupled via another cable 10 to the central controller 2. The central controller 2 is usable by an operator of the system 1 to configure exact-match flow tables in the host server devices. In addition, each of several of the host server devices is connected by a fifth cable to receive packet traffic from and to output packet traffic to an external network or external network device. Such an external network device may, for example, be a gateway device through which the system 1 within the data center interfaces with the internet outside the data center. In the illustrated example, the system 1 is coupled via two cables 1 land 12 to such a gateway device, and through the gateway device to the general internet outside the data center.

In one use example of system 1, the system 1 stores multiple items of inter-related information. In one example, host server device C3 implements a virtual web server. Although the virtual web server hosts a website, and may receive a packet containing an HTTP GET request from an external requestor for a web page hosted by the virtual web server, all the components of the web page requested are not stored on host server device C3. The HTTP GET request packet from the external request is received onto the system 1, and is supplied through various host server devices of the system 1 to the target host server device C3. How the packet is directed to the target host server device is determined by the exact-match flow tables in the host server devices, which in turn are determined by the central controller 2. The target host server device C3 receives the HTTP GET request packet, and in response sends packets to other host server devices of the system 1 that store components of the requested web page. The packets sent are requests for those host server devices to return the requested components. An example of a component is a JPEG image file that is part of the web page being requested. The host server devices respond by sending packets back to host server device C3, where the return packets contain the components requested. Host server device C3 assembles the web page using the components, and then outputs a packet (that contains the requested web page), through the array of host server devices, and out of the system, and back to the original requestor. If many web pages that can be requested from many of the virtual web servers of the system happen to store the same component, then the component can be stored once in the system. If a request is received for a web page that contains the common component, then the serving virtual web server can retrieve the common component from the one place where is it stored in the system. In this way, the component only needs to be stored in one place in the system, even though many web pages may contain that component. As a result, the amount of storage space required to store the data for the virtual web servers is reduced.

It is recognized that providing optical transceivers is a substantial expense in providing a system such as system 1. It is also recognized that adequate data communication bandwidth can be communicated economically between host server devices using less expensive metal conductor networking cables, as long as the metal conductor networking cables are not more than about D in length. Accordingly, in accordance with one novel aspect, substantially all cables in the system 1 that are length D or shorter are non-optical metal conductor networking cables. Each of these cables is as short as reasonably possible, while providing for adequately easy plugging into and unplugging from the host server devices to which it is to connect. There are no optical transceivers provided at the host server device at either end of such a non-optical conductor networking cable that is D or less in length, but rather the communication between the two host server devices across this cable is purely electrical. In the present example, all the cables illustrated in FIG. 1 as solid lines are 40GbasecR4 metal conductor networking cables that have QSFP form factor plugs at either end. The cable has four pairs of metal conductors for 40 Gbps communication in one direction, and four pairs of metal conductors for 40 Gbps communication in the opposite direction. Each cable that by necessity due to the physical organization of the host server devices in the racks of FIG. 1 is longer than the predetermined length D is an optical cable that has QSFP form factor plugs at either end. In the present example, all the cables illustrated in FIG. 1 as dashed lines are such optical cables that include optical fibers. Such an optical networking cable has four pairs of optical fibers for 40 Gbps communication in one direction, and four pairs of optical fibers for 40 Gbps communication in the opposite direction.

Figure 2B:
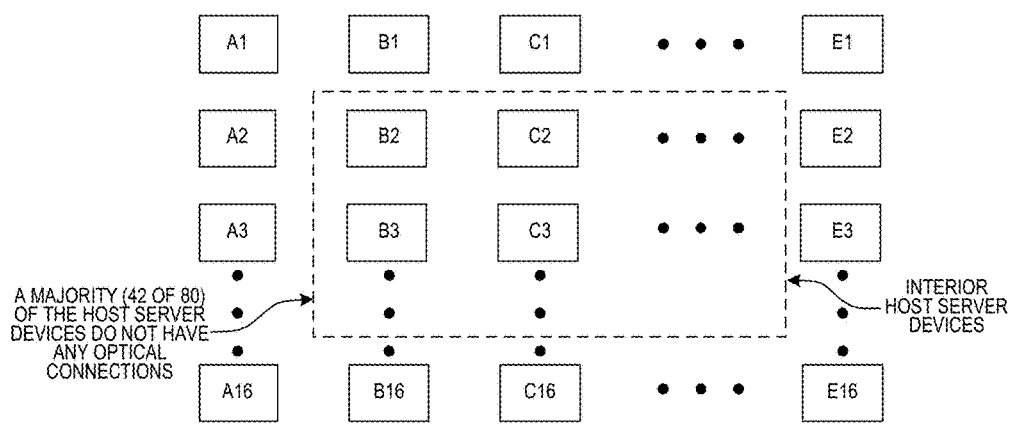
FIG. 2B is a diagram illustrating the ratio (42/80) of host server devices that do not have any optical cable connection to host server devices that do have an optical cable connection.

FIG. 2B is diagram that identifies the host server devices in the system 1 that do not couple to any optical cables, and that do not involve any optical transceivers. Due to the novel architecture of the system 1, a large percentage (>50 percent) of the host server devices does not couple to any optical cables, and does not involve any optical transceivers. In the particular example illustrated, forty-two of the eighty host server devices of system 1 do not have any optical connection. Accordingly, each host server device of a majority of the host server devices is coupled to four other host server devices by four cables, and yet is coupled to no optical cable and has no optical transceiver. These interior host server devices are made inexpensively to have no more cable sockets than necessary, which in this case is four cable sockets. The host server devices A4-A16, B1-B16, C1-C16, D1-D16 and E1-E16 have four and only four cable sockets. The host server devices A1-A3, on the other hand, have five cable sockets.

In order to reduce the cost of the overall system 1 further, expenses and costs and power consumption associated with providing ordinary SDN flow table packet lookup and switching are avoided. Realizing typical SDN flow lookup tables such as are commonly used in packet switching devices requires expensive hardware resources. The lookup table maintains flow entries against which an incoming packet is matched in order to lookup a result value that indicates how the packet is to be handled. A flow entry typically has a portions associated with corresponding fields or parts of a packet. Bits in such a portion can be indicated to be "wildcarded" or "don't cares" or "mask bits". By using wildcards or don't care or mask bits in the portion of the flow entry, the matching requirement of a corresponding field of an incoming packet is deemed satisfied by the wildcard indicator regardless of the values in of the bits in the corresponding field. Depending on the type of SDN flow table supported, whole fields of an incoming packet can be wildcarded, or individual bits can be wildcarded. In addition, the packet is typically tested against numerous such flow entries in a particular sequence until one of the flow entries matches, or until a final default flow entry is reached. Additional complexities and hardware costs are incurred due to having to provide such multiple levels of flow tables. Often a power hungry and expensive type of memory device called a TCAM (Ternary Content Addressable Memory) is used to store flow entries because the flow entries may include wildcard/don't care/mask bits. In accordance with one novel aspect, packets are switched in system 1 of FIG. 1 between host server devices of the system efficiently and relatively inexpensively without the host server devices having to use or store or maintain of any such flow table.

Figure 3:
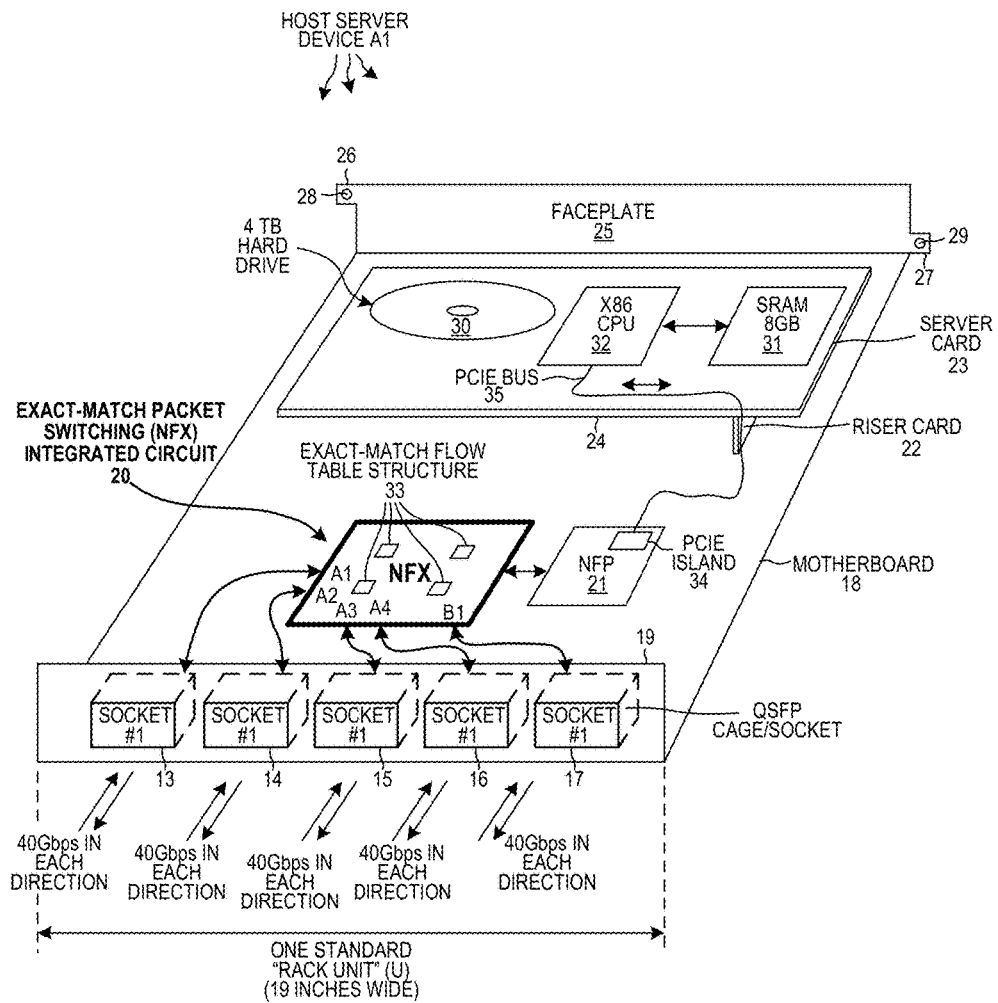
FIG. 3 is a more detailed diagram of a host server device.

FIG. 3 is a perspective diagram of one of the host server devices A1. The host server device A1 is shown with its top outer panel of its housing removed in order to show the components disposed within the housing. In the presently described specific embodiment, all the host server devices are identical, except that host server devices A1-A3 have one extra QSFP cable socket/cage. Host server device A1 has five and no more than five QSFP cable sockets/cages 13-17 into which networking cables can be plugged. Each QSFP cable socket/cage has a 38-pin angle connector that extends from the bottom of the socket/cage and that is soldered to the motherboard 18. The QSFP sockets/cages are accessible from the backside of the host sever device A1 at the backplate 19. A particular QSFP socket/cage can receive a plug end of an optical networking cable, where the plug at the end of the optical cable includes optical transceiver circuitry, or the QSFP socket/cage can receive a plug end of a non-optical networking cable, where the plug at the end of the non-optical cable does not include any optical transceiver circuitry. In either case, the QSFP socket/cage is the same, just the type of networking cable plugged into it differs. Communication across an optical cable affords 40 Gbps communication in both directions. Communication across a non-optical cable, due to the cables being relatively short, also affords 40 Gbps communication in both directions.

In addition to the QSFP sockets/cages 13-17, a novel exact-match packet switching integrated circuit 20 (NFX) and a network flow processor integrated circuit 21 (NFP) are mounted to the motherboard 18. A riser card 22 extends up from the horizontally from the top of the motherboard 18, and a server card 23 is coupled to the riser card 22 by an edge connector (not shown) on the bottom of the server card. The printed circuit board 24 of the server card 23 is disposed parallel to the motherboard 18 as illustrated. Reference numeral 25 identifies the faceplate of the housing. To install the host server device A1 into a slot in a rack, the host server device A1 is slid into the slot from the faceplate side of the rack so that the host server device slides along the rails of the slot until the ears 26 and 27 on the faceplate 25 abut vertical members of the rack. The ears 26 and 27 of the faceplate are then bolted to the rack by bolts that extend through bolt holes 28 and 29.

In accordance with one novel aspect, in order to reduce the manufacturing cost of the host server device, and to take advantage of economies of scale in the server manufacturing market, the server card 23 is an off-the-shelf commercially available server card that is manufactured in high volumes for applications other than for the system 1 being described here. In the present example, at the current time of the writing of this patent document, one appropriate commercially-available server card includes a 4 Tbyte spinning hard disk 30, 8 GB of SRAM 31, and a host processor such as an Intel E3-20-12V Central Processing Unit (CPU) 32.

Importantly, the exact-match packet switching integrated circuit 20 (NFX) includes an exact-match flow table structure 33, which as explained in further detail below includes four exact-match flow table structures 33A, 33B, 33C and 33D, one in each corner portion of the NFX integrated circuit 20. The term exact-match flow table structure can refer to the combination of the four exact-match flow table structures 33A, 33B, 33C and 33D in the four corner portions, or may refer to one of the exact-match flow table structures in one corner. The overall exact-match flow table structure 33 of the NFX integrated circuit 20 maintains an exact-match flow table, and does not store any flow entry that has any wildcard indicator or don't care indicator or mask bit or bits. The term exact-match flow table as it is used here may refer to the overall combination of the exact-match flow tables in the four corner portions of the NFX integrated circuit, or may refer to one of the exact-match flow tables in one of the corner portions.

In one specific example of the system, none of the host server devices of the system (including its NFX integrated circuit, its NFP integrated circuit, and its server card) stores or maintains a flow table that stores any flow entry with a wildcard. The host server devices (including their NFX integrated circuits, their NFP integrated circuits, and their server cards) only perform exact-match packet switching. If a packet is received into the system that does not result in an exact match, then the central controller 2 of the system is alerted and the central controller 2 can update the flow tables of the system with flow entries so that handling of packets of this same flow will thereafter result in exact matches and so that packets of this same flow can thereafter pass through the system as desired by the central controller 2.

The central controller 2 determines and controls which particular flow entries are stored in each of the exact-match flow tables of entire system 1 of FIG. 1. In this way, the central controller 2 can load the exact-match flow tables of the system so that a packet of a particular flow that is received onto the system from the external network via one of cables 11 and 12 will be forwarded, from host server device to host server device, to a particular desired worker host server device as desired by the central controller 2. Likewise, the central controller 2 can load the exact-match flow tables so that a packet of the particular flow as output by the worker host server device will be forwarded from host server device to host server device and back across one of the cables 11 and 12 to the external network. How the packets of any flow are forwarded through the system 1 is under the control of the central controller 2 due to its control of the flow entries in the exact-match flow tables. To direct a particular host server device to add a particular flow entry into its exact-match flow table, the central controller 2 sends a special command packet through the other host server devices of the system to the target host server device. In receiving the special command packet, the target host server device recognizes the packet as a special command, and in response to the special command adds a flow entry carried in the special packet into its exact-match flow table. In similar fashion, the central controller 2 can send any host server device in the system a special command that is an instruction to delete a particular flow entry. In the particular example of the system described here, none of the exact-match packet switching integrated circuits (NFX) of the system can add a flow entry to, or delete a flow entry from, its exact-match flow table unless it is instructed to do so by the central controller 2. In addition, the central controller 2 can send any host server device in the system a special instruction that instructs the host server device how to make a Flow ID out of an incoming packet.

In operation, a packet is received onto the host server device A1. From the various bits and fields of the packet, the host server device generates a Flow ID as explained in further detail below. Exactly how the host server device converts packet information into the generated Flow ID is controlled and determined by the central controller 2, and can be changed by the central controller 2. Once the Flow ID has been generated, the exact-match flow table structure looks through its exact-match flow table to determine if one of its stored flow entries contains the generated Flow ID. If each bit of the generated Flow ID is an exact match for a corresponding bit of one of the Flow IDs stored in the exact-match flow table, on a bit-by-bit basis, then a result value stored in association with the matching Flow ID is identified. This result value indicates how the packet will be handled by the host server device. The result value may, for example, indicate that the packet will be output from the host server device from a specified QSFP egress port of the host server device. The result value may, for example, indicate that the packet is to be forwarded to the NFP integrated circuit 21, through the PCIe island 34, and across the PCIe bus 35, and to the host CPU 32 on the server card 23. The result value may, for example, indicate that another type of packet is to be generated on the exact-match packet switching integrated circuit 20, and that the generated packet is then to be output from the host server device via a specific QSFP egress port. The exact-match switching integrated circuit 33 is therefore able to receive and forward packets in accordance with flow entries in its exact-match flow table, without having to use any TCAM that stores flow entries, without having to consult any flow table that stores wildcards, without having to have any instruction-fetching processor perform any software processing on the packet in order to determine a Flow ID, and without having to forward the packet to a host computer for further processing. Packets can be rapidly and easily received from a cable port and onto the NFX integrated circuit, and can then be output from the NFX integrated circuit and out to an appropriate cable port, thereby passing through the host server device while totally bypassing the NFP integrated circuit 21 and the host server card 23.

Figure 4:
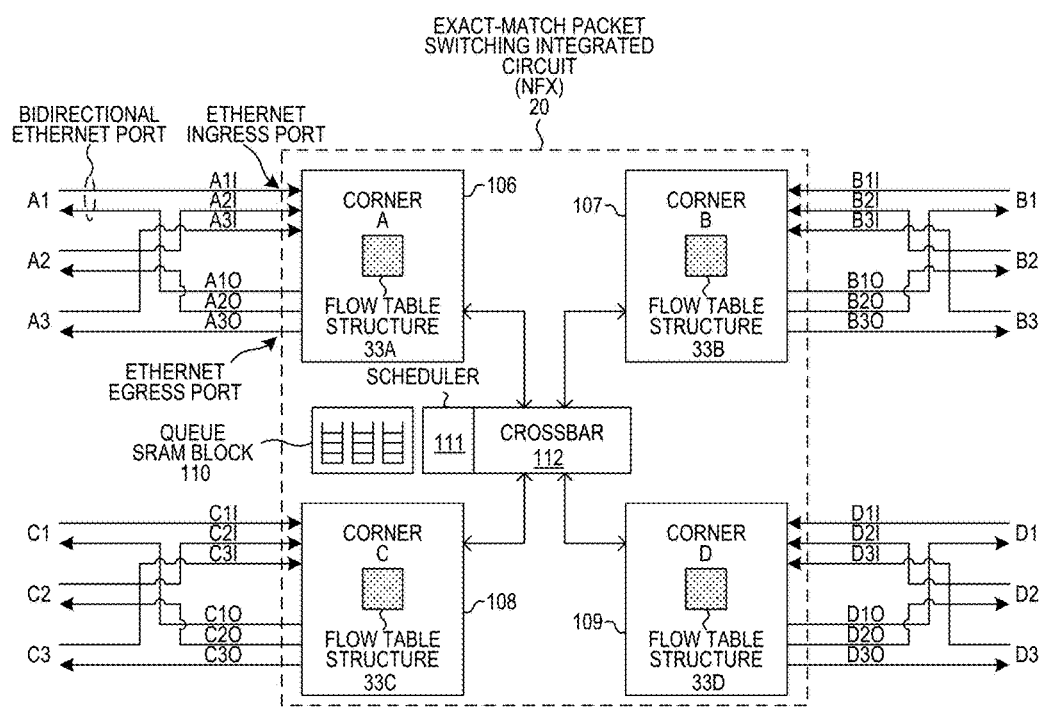
FIG. 4 is a more detailed diagram of the of exact-match packet switching integrated circuit (NFX) within the host server device of FIG. 3.

FIG. 4 is a more detailed diagram of the novel exact-match packet switching integrated circuit 20 (NFX) of FIG. 3. NFX integrated circuit 20 includes four corner portions 106-109 (denoted Corner A, Corner B, Corner C, and Corner D), a queue SRAM block 110, a scheduler 111, and a central crossbar switch circuit 112. Each corner portion stores its own exact-match flow table as illustrated. Each corner portion has three 40 Gbps ethernet MAC ingress ports and three 40 Gbps ethernet MAC egress ports. For Corner A (106), the three ingress ports are denoted A1I, A2I and A3I, and the four egress ports are denoted A1O, A2O and A3O. Packet traffic coming into the exact-match packet switching integrated circuit (NFX) is received via one of the ingress ports of a corner, and is communicated to the crossbar switch circuit 112, and then if appropriate is switched to exit the NFX via an egress port of one of the corner portions. The crossbar switch circuit 112 directs the packet to the appropriate corner portion from which the packet will exit the NFX.

In the specific embodiment of FIG. 4, the exact-match packet switching integrated circuit (NFX) 20 does not store or maintain any flow tables that include wildcards. The exact-match packet switching integrated circuit (NFX) 20 never unilaterally decides that a new flow entry is to be added to its exact-match flow table, but rather the decision/instruction to load a new flow entry into its exact-match flow table is always received from an external source and the exact flow entry to load into the exact-match flow table is generated by the external source. The exact-match packet switching integrated circuit (NFX) only responds to external commands to load a new flow entry into its exact-match flow table.

For additional information on the exact-match packet switching integrated circuit (NFX) 20, see U.S. Patent Application Serial Numbers: 1) Ser. No. 14/634,844, entitled "A MODULAR AND PARTITIONED SDN SWITCH", 2) Ser. No. 14/634,845, entitled "METHOD OF HANDLING SDN PROTOCOL MESSAGES IN A MODULAR AND PARTITIONED SDN SWITCH", 3) Ser. No. 14/634,847, entitled "FORWARDING MESSAGES WITHIN A SWITCH FABRIC OF AN SDN SWITCH", 4) Ser. No. 14/634,848, entitled "METHOD OF DETECTING LARGE FLOWS WITHIN A SWITCH FABRIC OF AN SDN SWITCH", 5) Ser. No. 14/634,849, entitled "METHOD OF GENERATING SUBFLOW ENTRIES IN AN SDN SWITCH", and 6) Ser. No. 14/634,851, entitled "SDN PROTOCOL MESSAGE HANDLING WITHIN A MODULAR AND PARTITIONED SDN SWITCH", all of which were filed Mar. 1, 2015, by Gavin J. Stark, et al. (the subject matter of these patent documents is incorporated herein by reference).

Figure 5:
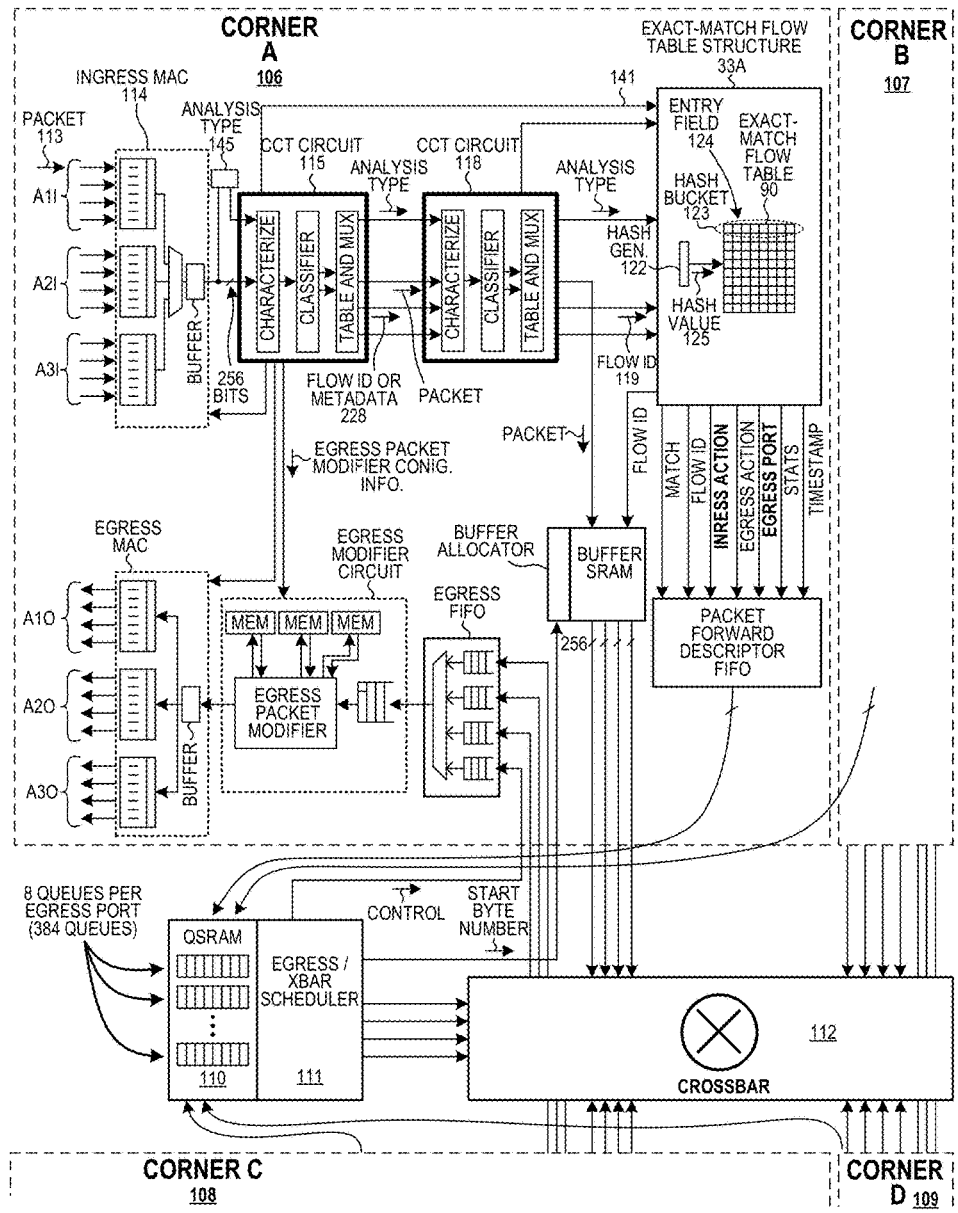
FIG. 5 is a more detailed diagram of one corner portion, Corner A, of the exact-match packet switching integrated circuit (NFX) of FIG. 4.
Figure 6:
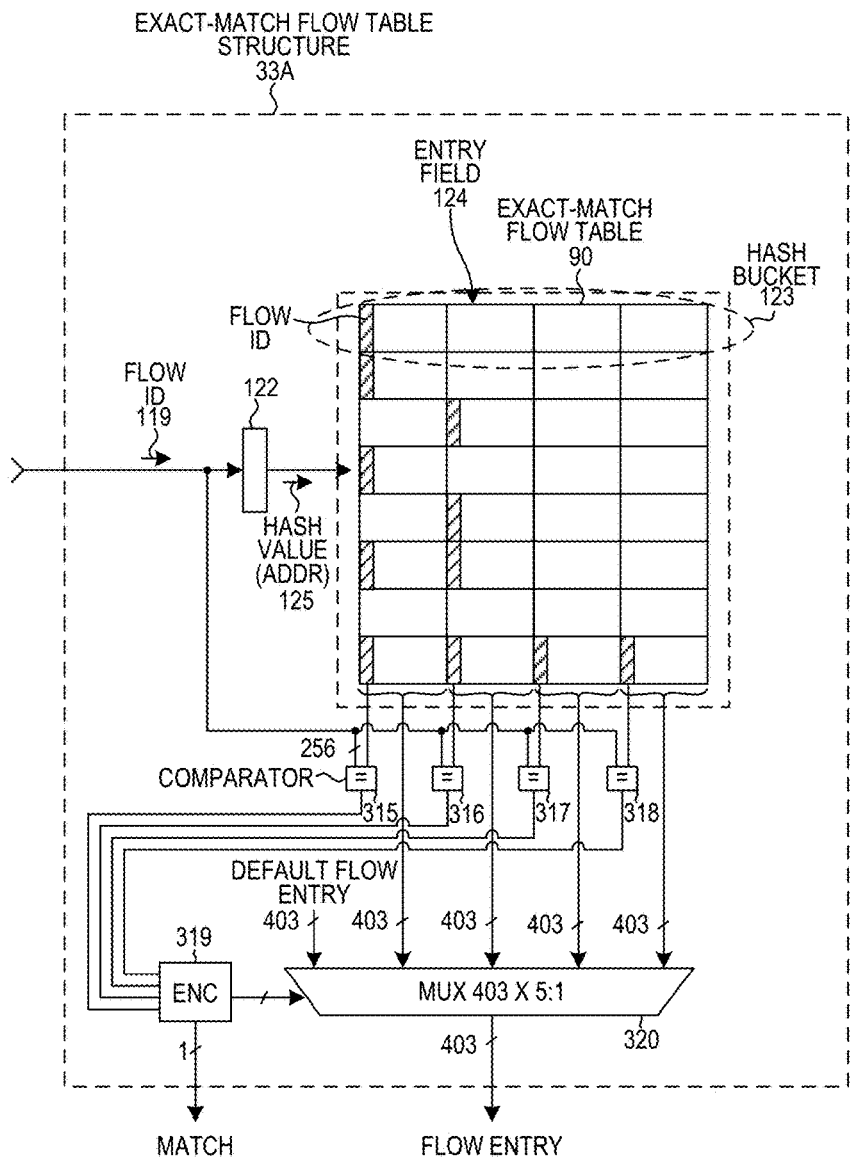
FIG. 6 is a diagram of the exact-match flow table structure within Corner A of FIG. 5.

FIG. 5 shows one corner portion, Corner A (106), of the exact-match packet switching integrated circuit (NFX) 20 of FIG. 4 in further detail. The circuitry of each of the four corner portions Corner A, Corner B, Corner C, and Corner D is identical to the circuitry of each other corner portion. FIG. 6 is a diagram of the exact-match flow table structure 33A within Corner A.

In the case of a packet coming into Corner A, the incoming packet 113 is received onto one of the ingress ports by ingress MAC circuit 114. For additional information on ingress MAC circuit 114, see: U.S. patent application Ser. No. 14/321,732, entitled "Merging PCP Flows As They Are Assigned To A Single Virtual Channel", filed Jul. 1, 2014, by Joseph M. Lamb (the subject matter of which is incorporated herein by reference). The corner portion Corner A includes two Characterize/Classify/Table Lookup and Mux (CCT) circuits 115 and 118 and an analysis type RAM 145. Analysis type RAM 145 is a lookup memory. The output of ingress MAC 114 is provided to analysis type RAM 145 and CCT circuit 115. In response, analysis type RAM 145 outputs an analysis type value. The analysis type value determines the type of analysis to be performed by the characterizer within the CCT circuit 115. The analysis type value is a 2-bit value that configures the CCT circuit to perform characterization of a specific type of packet that is known to be received on a specific port number. The analysis type RAM 145 is programmed under the control of the central controller 2. CCT circuits 115 and 118 are identical circuits.

Figure 7:
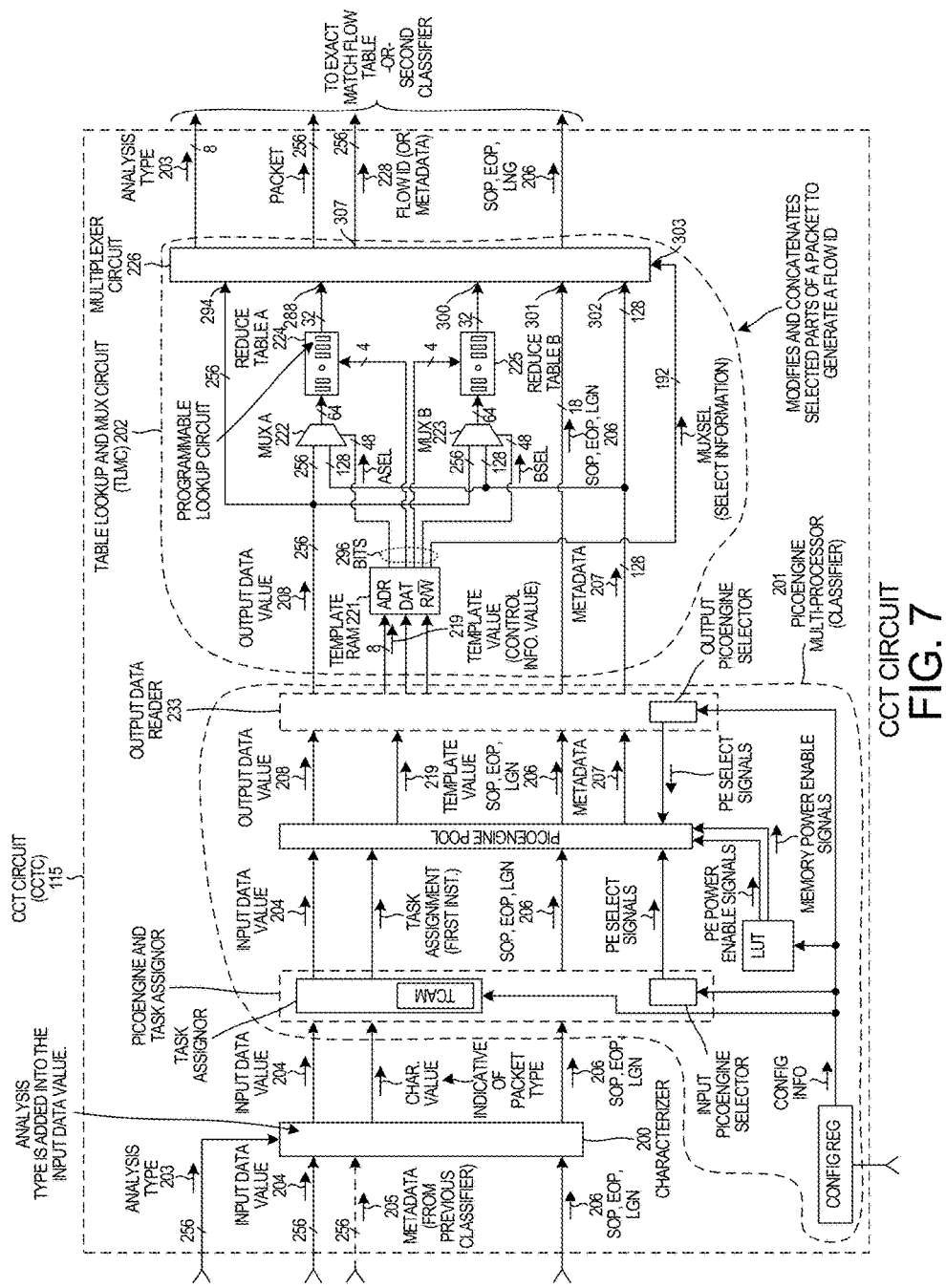
FIG. 7 is a more detailed diagram of a Characterizer Classifier Table (CCT) circuit in the exact-match packet switching integrated circuit (NFX) of FIG. 4.

FIG. 7 shows the CCT circuit 115 in greater detail. CCT circuit 115 includes a characterizer circuit 200, a classifier circuit 201, and a Table Lookup and Multiplexer Circuit (TLMC) 202. Characterizer 200 receives an analysis type 203 from analysis type RAM 145, an input data value 204 from ingress MAC 114, metadata 205 from a previous classifier (not applicable to CCT circuit 115), and start of packet (SOP) and end of packet (EOP) and length of packet (LGN) data 206 from ingress MAC 114. The characterizer 200 outputs the input data value 204, a characterization value, and the SOP, EOP and LGN data 206 to classifier 201.

Figure 8:
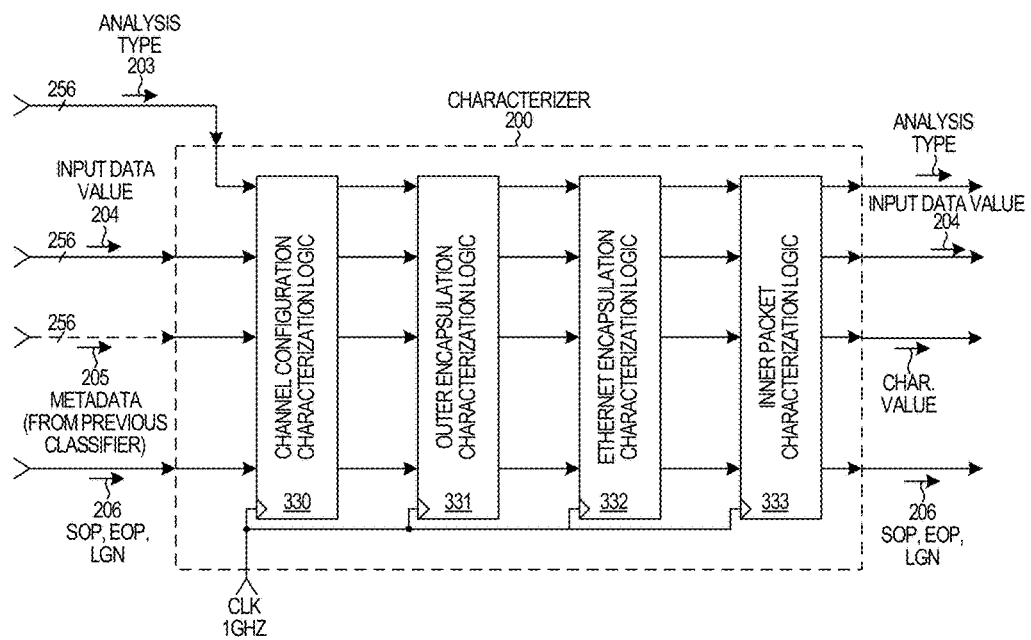
FIG. 8 is a more detailed diagram of a Characterizer in the CCT circuit of FIG. 7.

FIG. 8 illustrates the characterizer 200 in greater detail. The characterizer 200 combines the analysis type value 203 and the input data value 204 (256 bits of an incoming packet) and generates a characterization of the packet (characterization data). The analysis type is configured on a logical channel basis, that is, every logical channel can be assigned a different analysis type value to be used by the characterizer. The analysis type value indicates the first level of characterization required for the packet. The characterizer 200 includes four characterization stages: a channel configuration characterization stage 330, an outer encapsulation characterization stage 331, an ethernet encapsulation characterization stage 332, and an inner packet characterization stage 333. The channel configuration characterization stage 330 performs packet characterization based on channel information. Based on the channel number, the channel configuration characterization stage determines: (i) the amount of 16-bit quantities to skip at the start of the packet to get to the true start of the packet (skips any MAC prepend or external switch prepend); and (ii) determines whether the packet is required to have General Framing Procedure (GFP) framing, Point-to-Point Protocol (PPP) framing, or Ethernet framing. The outer encapsulation characterization stage 331 performs packet characterization based on the framing type determines by the stage 330. Based on the framing type determined in stage 330, the outer encapsulation characterization stage 331 generates: (i) an Ethernet encapsulation type and a start offset of the Ethernet packet; or (ii) an inner packet type and a starting offset into the packet of the inner packet (e.g. IPv4 at starting offset 14). Ethernet encapsulation characterization stage 332 performs Ethernet characterization if the previous stages indicate that the packet is an ethernet packet. Stage 332 can skip various field types and VLAN tags included in the packet. Stage 322 generates information regarding the Ethernet encapsulation, the inner packet type, and a starting offset into the packet of the inner packet. The inner packet characterization stage 333 characterizes the inner packet depending on the inner packet type determined by the outer encapsulation characterization stage 331 or the Ethernet capsulation characterization stage 332. The inner packet characterization stage 333 generates information about the inner packet header, and an indication of the starting offset of the payload encapsulated within the inner packet. In this fashion, characterizer 200 is utilized to perform a first level of packet characterization in high speed combinatorial logic. A second level of packet classification is performed by classifier 201. The characterization value is communicated to a picoengine in the picoengine pool included in the classifier 201.

FIG. 9 is a diagram that illustrates the characterization values as output from characterizer 200 and as supplied to the classifier 201. The classifier 201 is an instance of the picoengine pool as described in: 1) U.S. patent application Ser. No. 14/267,298, entitled "Kick-Started Run-To-Completion Processor Having No Instruction Counter", filed May 1, 2014, by Gavin J. Stark; and 2) U.S. patent application Ser. No. 14/311,222, entitled "Skip Instruction To Skip A Number Of Instructions On A Predicate", filed Jun. 20, 2014, by Gavin J. Stark (the subject matter of these two patent documents is incorporated herein by reference). As explained in those patent documents, the picoengines of the picoengine pool are very small run-to-completion processors that and do not fetch instructions on their own (without external prompting or without being prompted to by having executed a fetch instruction), and that do not have instruction counters. Accordingly, the CCT circuit 115 does not include any processor that fetches instructions (without being prompted to by an external trigger or without being instructed to by having executed a specific fetch instruction), and that does not have an instruction counter, and that analyzes packets. This CCT circuit 115 does, however, characterize and classify the incoming packet, thereby generating metadata 207 about the packet. The resulting metadata 207 can include information about the packet, information about the flow to which the packet belongs, information about how the packet was initially processed, and so forth. If the port is in a "command mode", then the classifier 115 interprets the incoming packet as a special command packet, and orchestrates carrying out the operation called for by the opcode of the command packet, and if necessary generates a special command mode command packet that is then output from an appropriate egress port of the NFX.

In one example, the CCT circuit 115 configures a picoengine within the picoengine pool to perform a first sequence of instructions when the analysis type is set to a first value, and configures the picoengine of the picoengine pool to perform a second sequence of instructions when the analysis type is set to a second value. CCT circuit 115 writes to the various memories located in corner A 106 via connections 141. Logic (not shown) included in CCT circuit 115 generates the address, data, and control signals based on output data from a picoengine. This logic is not shown but standard registered IO architecture can be used.

Figure 10:
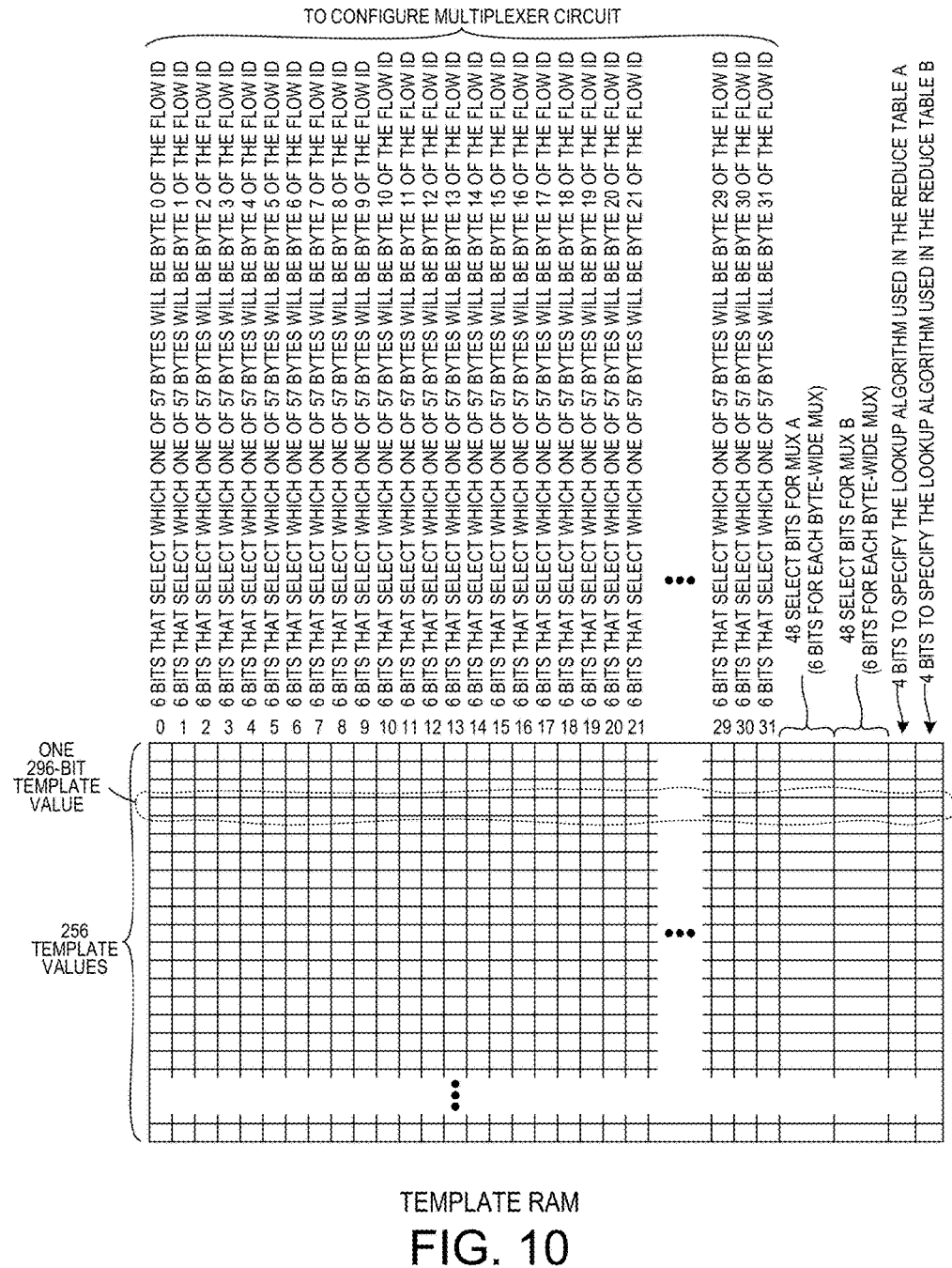
FIG. 10 is diagram of the contents of the template RAM of the CCT circuit of FIG. 7.

In addition to generating metadata, the classifier 201 outputs an output data value 208, a template value 219, and start of packet (SOP), end of packet (EOP), length of packet (LGN) data 206. These outputs are provided to table lookup and mux circuit (TLMC) 202. Table lookup and mux circuit 202 includes a template RAM 221, mux A 222, mux B 223, a reduce table A 224, and a reduce table B 225, and a multiplexer circuit 226. The template RAM 221 has multiple inputs including an address input, a data input, and a read/write input. In operation, the output data reader 233 of the classifier 201 can write a template value 219 into the template RAM 221 and can supply address to the template RAM 221 so to cause the template RAM 221 to output multiple values to multiple multiplexer circuits and both reduce tables 224 and 225. In this fashion, the classifier 201 is able both to program the template RAM 221 as well as to select one of a plurality of template values stored in the template RAM 221. Selecting different template values will change the select input to the multiple multiplexer circuits, thereby adjusting which input terminal of a multiplexer circuit is coupled to the multiplexer circuit's output terminal and specifying the lookup performed by each reduce table. The contents of template RAM 221 are illustrated in FIG. 10.

The output data value 208 is coupled to a first input of the multiplexer circuit 226, a first input of the mux A 222, and a first input of the mux B 223. The metadata 207 is coupled to a second input of the multiplexer circuit 202, a second input of the mux A 222, and a second input of the mux B 223. The SOP, EOP, LGN data 206 is coupled to a fourth input of the multiplexer circuit 226. The output of mux A 222 is coupled to an input of reduce table A 224 and the output of the reduce table A 224 is coupled to a fourth input of the multiplexer circuit 226. In a similar fashion, the output of the mux B 223 is coupled to an input of reduce table B 225 and the output of the reduce table B 225 is coupled to a fifth input of the multiplexer circuit 226.

In operation, the classifier controls (via the information in the template RAM 221) (i) whether the output data value 208 or the metadata 207 is input to reduce table A 224 through mux A 222, (ii) whether the output data value 208 or the metadata 207 is input to reduce table B 225 through mux B223, (iii) the type of lookup algorithm to be performed by reduce table A 224, (iv) the type of lookup algorithm to be performed by reduce table A 225, and (v) how the 6-bit compressed bits will be placed within a Flow ID. The resulting Flow ID 228 is a 256-bit value that is unique to the packet flow to which the packet belongs. The Flow ID 228 includes certain packet headers as is without any modification and "compressed" (reduced number of bits) versions of other packet headers. Other packet headers are omitted all together and are not included into the Flow ID at all (e.g. due to knowledge of how the NFX integrated circuit is connected the omitted packet headers do not contain any useful information).

The Flow ID 228 does not include any wildcards. The Flow ID 228 is not just selected bits from only one field of the packet header. In one example, selected bits are taken from the IP source field of the packet header, the IP destination field of the packet header, the TCP source port field of the packet header, the TCP destination port field of the packet header, and application layer protocol. Mux A and mux B perform this selection.

Figure 11:
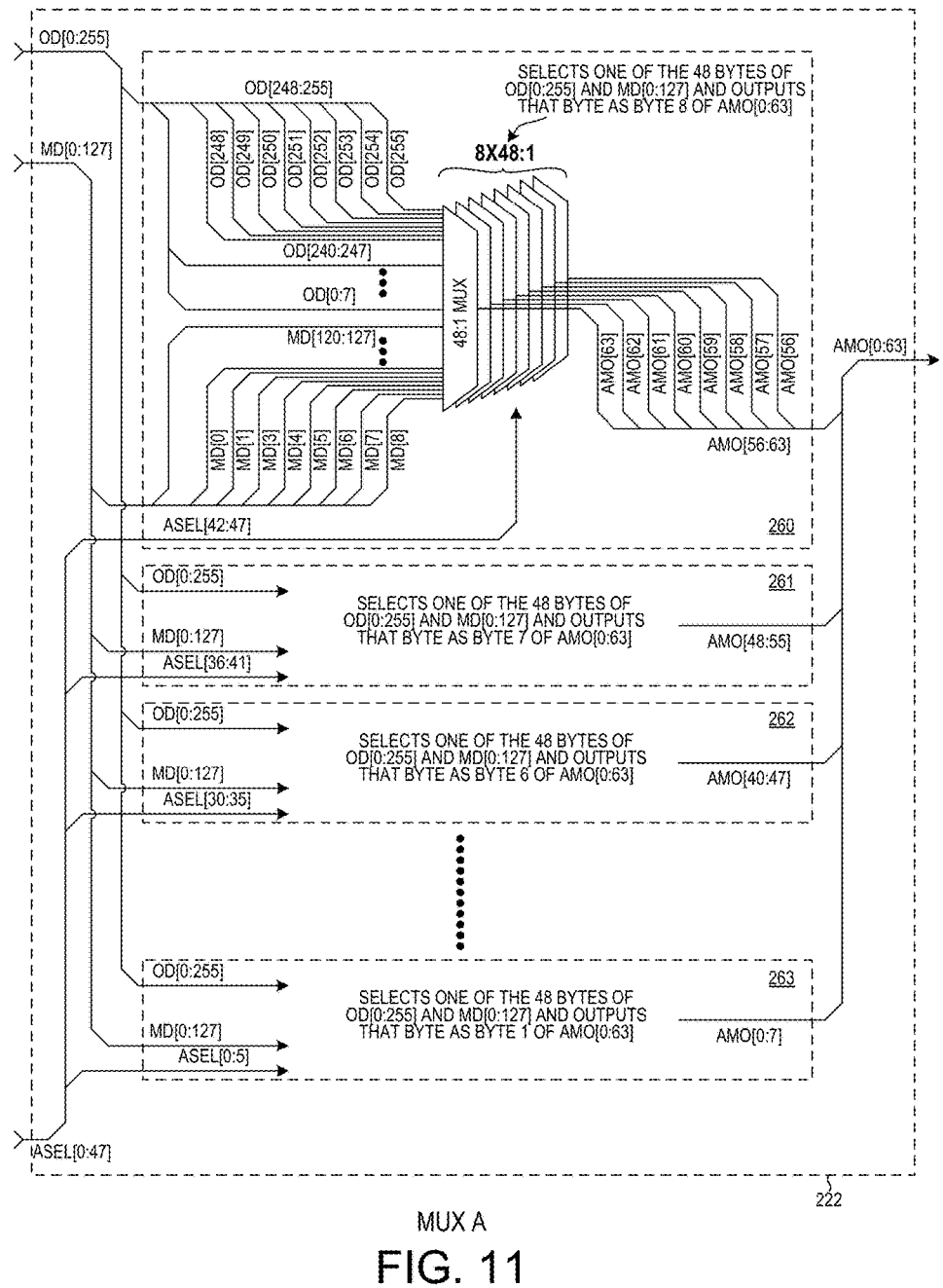
FIG. 11 is a more detailed diagram of MUX A within the of the CCT circuit of FIG. 7.

FIG. 11 shows the structure of mux A 222 in greater detail. Mux A 222 includes multiple groups of multiplexers 260-263. Each group of multiplexers includes eight 48:1 multiplexers. The first group of multiplexers 260 receives output data OD[0:255] and metadata MD[0:127], the switching of which is controlled by ASEL[42:47] output by the template SRAM 221. Each bit of ASEL[42:47] is connected to one of the eight multiplexers. The second group of multiplexers 261 receives output data OD[0:255] and metadata MD[0:127], the switching of which is controlled by ASEL[36:41] output by the template SRAM 221. The third group of multiplexers 262 receives output data OD[0:255] and metadata MD[0:127], the switching of which is controlled by ASEL[30:35] output by the template SRAM 221. The last group of multiplexers 263 receives output data OD[0:255] and metadata MD[0:127], the switching of which is controlled by ASEL[0:5] output by the template SRAM 221.

Figure 12:
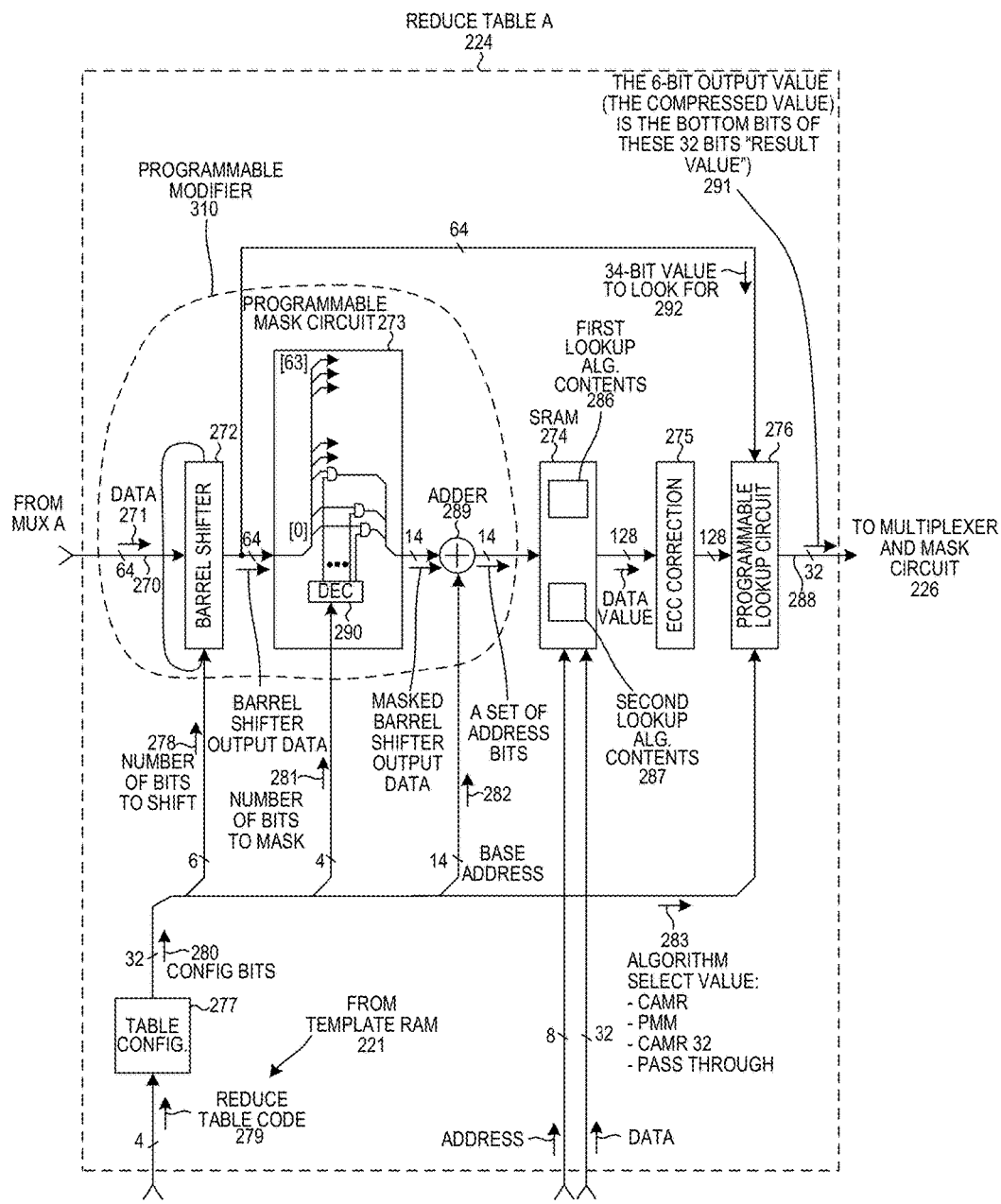
FIG. 12 is a more detailed diagram of the reduce table A within the CCT circuit of FIG. 7.

Reduce table A 224 receives output from MUX A 222, and generates a reduced MAC destination address. The reduce table A 224 is shown in greater detail in FIG. 12. Reduce table A 224 includes a barrel shifter 272, a programmable mask circuit 273, an adder circuit 289, an SRAM 274, an ECC correction circuit 275, a programmable lookup circuit 276, and a configuration table 277. In operation, reduce table code 279 is received by the configuration table 277 from the template RAM and causes the configuration table 277 to output configuration bits 280. Different portions of the configuration bits 280 are coupled to different circuits within the reduce table A 224. In one example, configuration bits 280 includes thirty-two bits, six of which are identified as a number of bits to shift 278, four of which are identified as a number of bits to mask 281, 14 of which are identified as a base address 282, and eight of which are identified as an algorithm select value 283.

Figure 14:
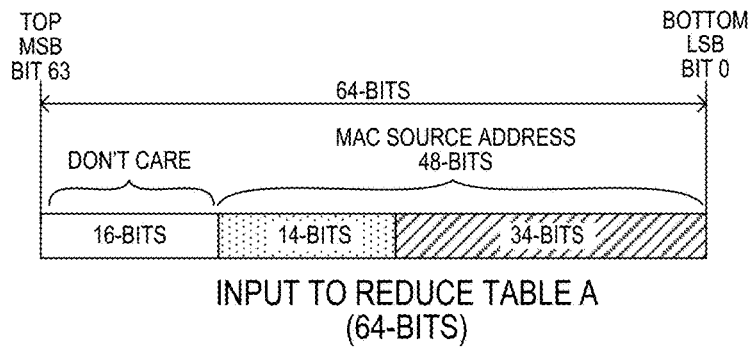
FIG. 14 illustrates the data that is supplied to the reduce table A of the CCT circuit of FIG. 7.

Either the output data value 208 or the metadata 207 is supplied via connections 270 to barrel shifter 272 from mux A 222 as shown in FIG. 7. FIG. 14 illustrates the input data 271 that is supplied to reduce table A. The input data 271 includes sixteen don't care bits and forty-eight MAC source address bits. The top fourteen bits of the MAC source address need to be bottom aligned so to be aligned for the programmable mask circuit 273. The bottom thirty-four bits of the MAC source address need to be top aligned so to be aligned to for lookup algorithm performed by circuit 276. Barrel shifter 272 rotates the input data according to the number of bits to shift value 278 in order to provide the desired alignment.

Figure 15:
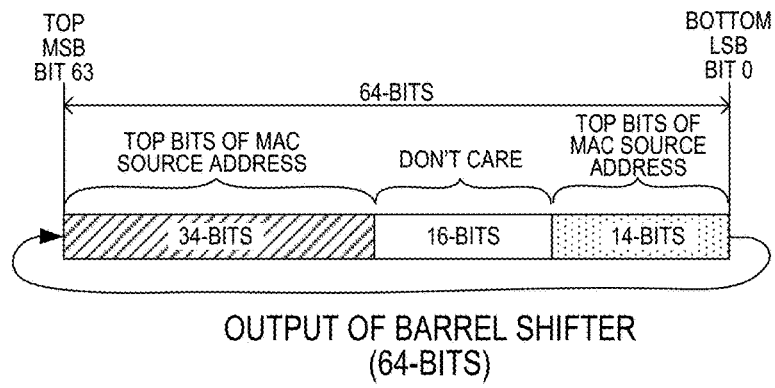
FIG. 15 illustrates data that is output from the barrel shifter in the reduce table A of FIG. 12.

FIG. 15 illustrates the bit alignment of the data output from barrel shifter 272. As desired, the thirty-four bits of MAC source address are top aligned and the fourteen bits of MAC source address are bottom aligned. The shifted data is coupled from barrel shifter 272 to programmable mask circuit 273 and programmable lookup circuit 276. In the specific example illustrated in FIG. 12 only the top thirty-four bits of the shifted data 292 are provided to the programmable lookup circuit 276. The programmable mask circuit 273 includes a decoder 290 that generates fourteen binary output signals ("barrel shifter output data") in response to receiving the number of bits to mask value 281. Each of the fourteen binary output signals is coupled to a first input of a respective AND gate. A second input of each AND gate is coupled to receive one of the bottom fourteen bits of the shifted data from the barrel shifter. The programmable mask circuit 273 thereby outputs a 14-bit masked value ("masked barrel sifter output data") to the input of adder 289. The adder 289 performs a bit-wise addition of the 14-bit masked value and the base address value 282 and outputs the results ("a set of address bits") to SRAM 274. The combination of barrel shifter 272, programmable mask circuit 273 and adder 289 is referred to herein as "a programmable modifier" 310.

Figure 16:
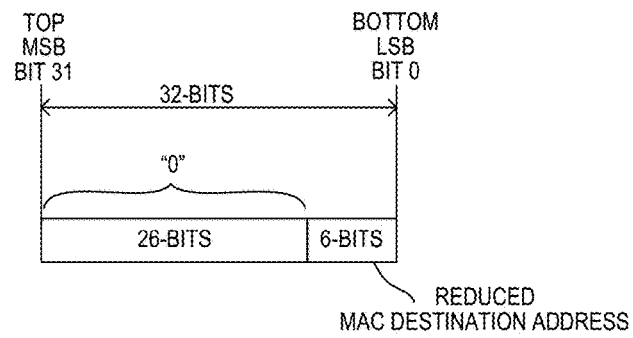
FIG. 16 illustrates an output value that is output from reduce table A.

SRAM 274 includes both a first lookup algorithm contents 286 and a second lookup algorithm contents 287. The result from adder 289 serves as an address into SRAM 274. In response to receiving the result from adder 289, the SRAM 274 outputs a data value to ECC correction 275. The data value is then output to programmable lookup circuit 276. The type of algorithm performed by programmable lookup circuit 276 is determined by the algorithm select value 283. In one example the programmable lookup circuit 276 can perform a CAMR 34 lookup operation. The programmable lookup circuit 276 is an instance of the CAMR 32 lookup circuit as described in: 1) U.S. patent application Ser. No. 13/598,448, entitled "TRANSACTIONAL MEMORY THAT PERFORMS A CAMR 32-BIT LOOKUP OPERATION", filed Aug. 29, 2012, by Gavin J. Stark (the subject matter of which is incorporated herein by reference). A 6-bit output value 291 is output by the lookup algorithm 276 after performing the CAMR 34 lookup operation. The 6-bit output value is a compressed or "reduced" version of the 64-bit input the data value 271. FIG. 16 illustrates the output value 291 from reduce table A. The 6 bits of reduced MAC destination address are bottom aligned and padded with 26 "0" s. The output value 291 is supplied to the multiplexer circuit 226.

Figure 17:
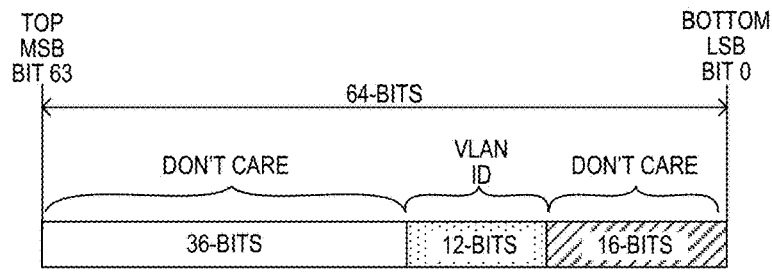
FIG. 17 illustrates an example of input data as supplied to reduce table B.
Figure 18:
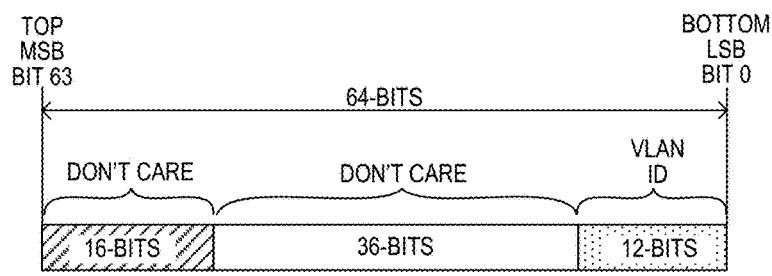
FIG. 18 illustrates data that is output from the barrel shifter within reduce table B.
Figure 19:
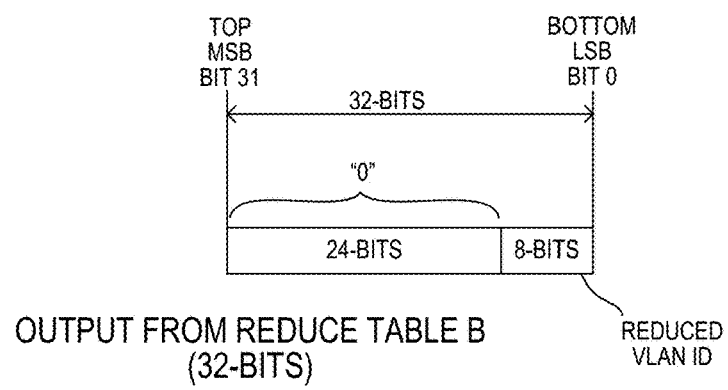
FIG. 19 illustrates an output value that is output from reduce table B.

Reduce table B 225 generates a reduced VLAN ID. The structure of reduce table B 255 is the same as the structure illustrated in FIG. 12 for reduce table A 224. FIG. 17 illustrates an example of input data as supplied to reduce table B 225. The input data is either output data value 208 or the metadata 207. In the present example, the input data includes 36 don't care bits that are top aligned, twelve bits of VLAN ID, and sixteen more don't care bits that are bottom aligned. In operation, the table configuration circuit sets configuration bits such that the algorithm select value is set to "pass through" mode. In pass through mode, the programmable lookup circuit automatically outputs one of the plurality of 6-bit values read from SRAM. The barrel shifter within reduce table B 225 rotates the input data such that the VLAN ID is bottom aligned as shown in FIG. 18. The twelve bits of VLAN ID are masked by the programmable mask circuit and are added to a base address value, thereby generating a set of address bits. The set of address bits is used to read a data value from the SRAM memory of the reduce circuit. The data value read from the SRAM memory includes one or more 6-bit values. In one example, based on the programmable lookup up circuit configuration, the programmable lookup circuit simply outputs the first of the data values read from the SRAM memory. FIG. 19 illustrates the output value that is output from reduce table B 225. The output value that is output from reduce table B includes eight bits of reduced VLAN that are bottom aligned and twenty-four "0" bits of padding for the remainder of the 32-bit output value.

Figure 13:
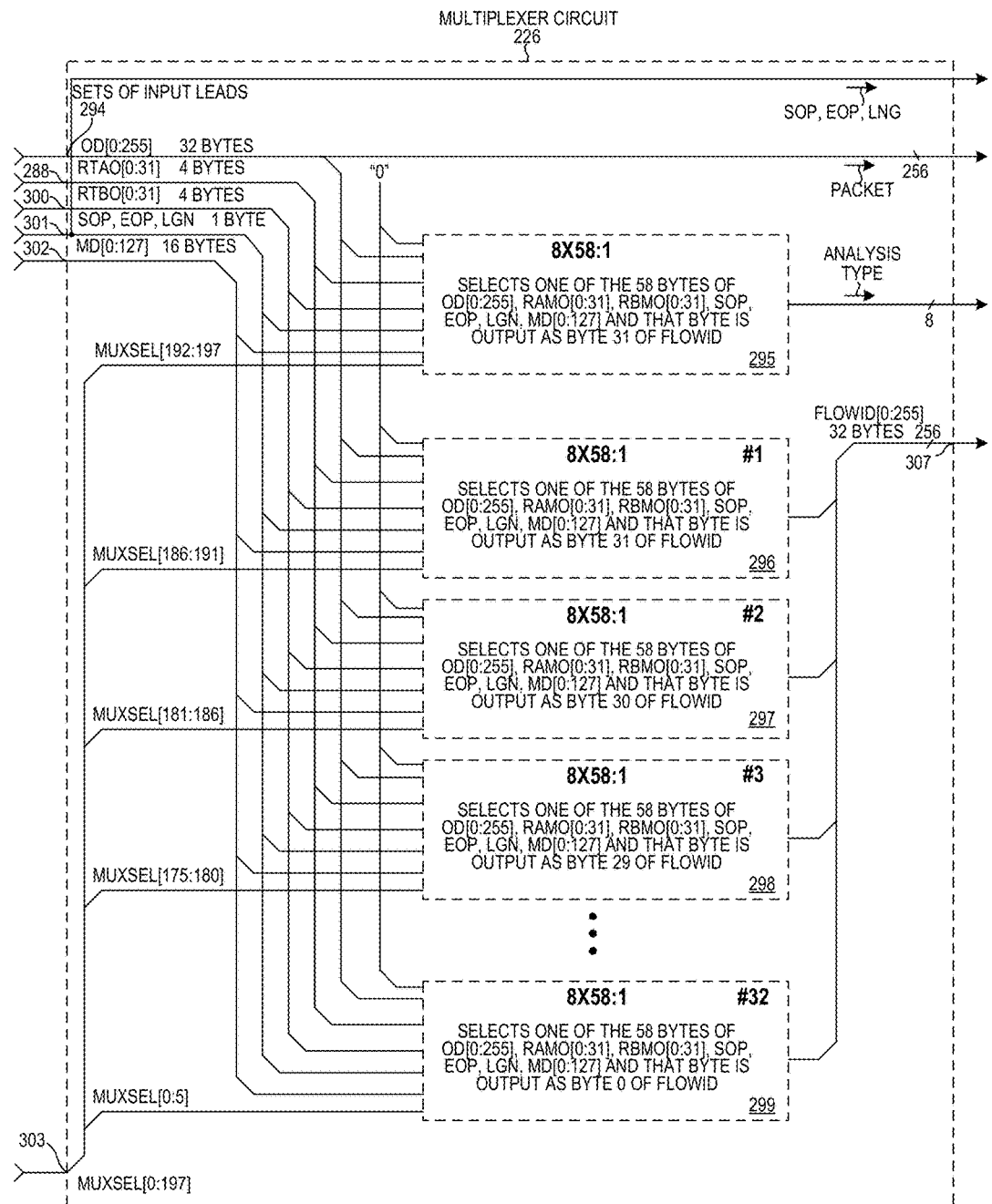
FIG. 13 is a more detailed diagram of a multiplexer circuit within the CCT circuit of FIG. 7.

FIG. 13 illustrates the multiplexer circuit 226 in greater detail. Multiplexer circuit 226 includes thirty-three groups of multiplexers 295-299. Each group of multiplexers includes eight 58:1 multiplexers. Each group of multiplexers receives output data OD[0:255] via connections 294, reduce table A output value RTAO[0:31] via connections 288, reduce table B output value RTBO[0:31] via connections 300, SOP, EOP, LGN data via connections 301, and metadata MD[0:127] via connections 302. The first group of multiplexers 295 also receives MUXSEL[192:197] via connections 303. The second group of multiplexers 296 also receives MUXSEL[186:191]. The third group of multiplexers 297 also receives MUXSEL[181:186]. The fourth group of multiplexers 298 also receives MUXSEL[175:180]. The last group of multiplexers 299 also receives MUXSEL[0:5]. The first group of multiplexers 295 output the analysis type value. The remaining thirty-two groups of multiplexers 296-299 combine to output thirty-two bytes of the Flow ID 228 via connections 307. In this fashion, the value stored in the template RAM 221 controls and determines the Flow ID that is output by the multiplexer circuit 226.

Figure 20:
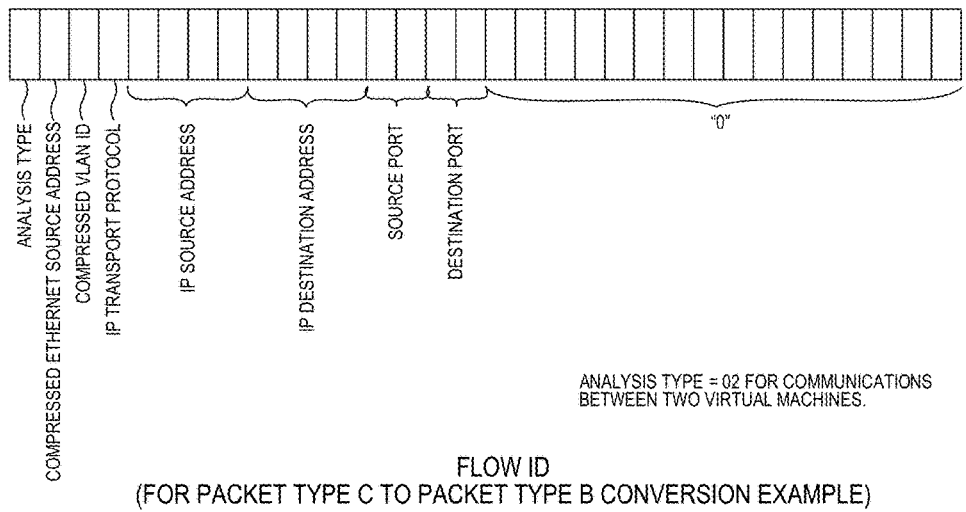
FIG. 20 illustrates the contents of each byte of a Flow ID, in one example.
Figure 21:
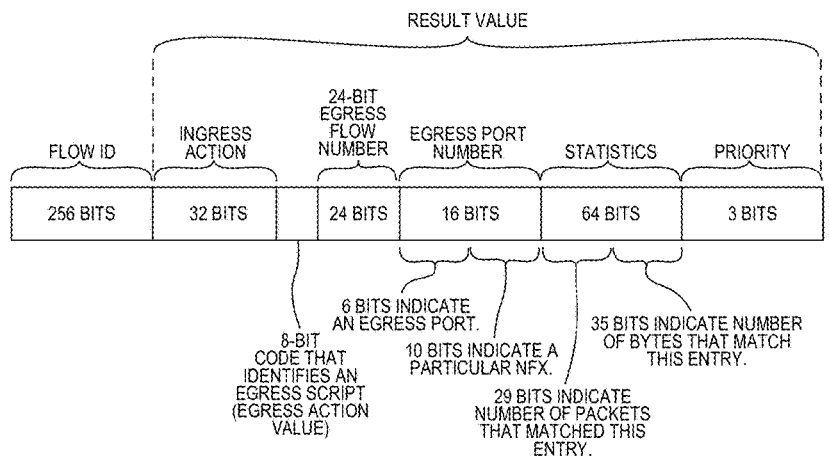
FIG. 21 is a diagram that shows the various parts of a flow entry in an exact-match flow table, in one example of an exact-match flow table.

FIG. 20 illustrates the contents of each byte of the Flow ID 228. Byte 0 of the Flow ID indicates the analysis type, byte 1 of the Flow ID is the compressed ethernet source address, byte 2 is the compressed VLAN ID, byte 3 is the IP transport protocol, bytes 4-7 are the IP source address, bytes 8-11 are the IP destination address, bytes 12-13 are the TCP source port, bytes 14-15 are the TCP destination port, and bytes 16-31 are "0s".

Referring back to FIG. 5, the CCT circuit 115 outputs the Flow ID 228 to CCT circuit 118. In the present example, CCT circuit 118 simply passes the Flow ID through to the input of the exact-match flow table structure 33A as Flow ID 119. Flow ID 119 is also referred to here as a "flow key" because it is used as a key in a hash lookup operation.

FIG. 6 shows the exact-match flow table structure 33A in further detail. The exact-match flow table structure 33A is a circuit that includes a hash generator circuit 122 and a memory and associated hash lookup circuitry. The exact-match flow table structure does not and cannot store a Flow ID that has wildcards. There is only one bit of SRAM that is used to store any single bit of a Flow ID. The memory maintains and stores the exact-match flow table 90 of the corner portion, where the exact-match flow table 90 includes a set of hash buckets, and where each hash bucket includes a set of entry fields. The illustrated hash bucket 123 is shown in the diagram as a row of boxes, where each box represents an entry field. A given entry field may be occupied with a flow entry, or it may be vacant. The second entry field of the bucket is identified by reference numeral 124. The hash generator 122 generates a hash value 125 from the Flow ID 119, and supplies the hash value 125 to the exact-match flow table circuitry. The hash value points to one of the hash buckets. In response, the Flow ID stored in each entry field of the selected bucket is supplied in parallel to a different comparator circuit 315-318. Each comparator circuit also receives the input Flow ID 119. The complete 403-bit flow entries are also output in parallel to corresponding respective inputs of a 403×5:1 multiplexer 320. Each comparator circuit determines if the Flow ID received from a corresponding respective one of the entry fields is an exact-match of input Flow ID 119. The output from each of the four comparator circuits 315-318 is grouped together to form a multi-bit select value that is supplied to an encoder 319. Encoder 319 outputs a single-bit match value MATCH that indicates if a Flow ID exact-match was found by comparator circuits 315-319. Encoder 319 also outputs a multi-bit select value to the 403×5:1 multiplexer 320. If an exact-match is found, then the entire 403-bit flow entry that included the matching Flow ID is output in parallel onto the output terminals of the 403×5:1 multiplexer 320. If an exact-match is not found, then a 403-bit default flow entry is output onto the multiplexer output terminals. The result value of the 403-bit flow entry as output from the exact-match flow table structure 33A indicates how the packet will be output from the NFX integrated circuit. In particular, the flow entry contains a result value portion, where the result values portion indicates: 1) the NFX corner portion that will output the packet, 2) the egress port, and 3) an identifier of an egress script to be performed on egress when the packet it output from the port.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A system of host server devices, comprising:
a plurality of columns of host server devices, wherein each respective one of the columns is mounted in a corresponding one of a plurality of racks, and the racks are disposed side-by-side one another in a row, and every one of the host server devices is coupled to at least one other of the host server devices by a networking cable, wherein each host server device of a majority of the host server devices is coupled: by a first non-optical cable to a first other host server device in a rack to one side of said each host server device, by a second non-optical cable to a second other host server device in a rack to an opposite side of said each host server device, by a third non-optical cable to a third other host server device above said each host server device in the same rack as said each host server device, and by a fourth non-optical cable to a fourth other host server device below said each host server device in the same rack as said each host server device, wherein said each host server device is not coupled to any of the other host server devices by any optical cable, and wherein said each host server device of the majority of host server devices includes: 1) a host processor, and 2) an exact-match packet switching integrated circuit that is identical to the exact-match packet switching integrated circuit of each of the other host server devices of the majority of host server devices, 3) a first cable socket port that is coupled to a first non-optical cable, 4) a second cable socket port that is coupled to a second non-optical cable, 5) a third cable socket port that is coupled to a third non-optical cable, 6) a fourth cable socket port that is coupled to a fourth non-optical cable, wherein the exact-match packet switching integrated circuit comprises an exact-match flow table structure, wherein the exact-match flow table structure comprises a Static Random Access Memory (SRAM), wherein the SRAM stores an exact-match flow table, wherein the exact-match flow table stores flow identifiers (Flow IDs), wherein the exact-match flow table structure does not and cannot store a Flow ID that includes any wildcard identifier, wherein said each host server device: a) receives a packet via one of its first through fourth cable socket ports, b) determines a Flow ID from the packet, c) uses the determined Flow ID to perform a lookup operation using the exact-match flow table structure to find a Flow ID stored in the exact-match flow table structure that is a bit-for-bit exact match for the determined Flow ID and thereby to obtain a result value that is stored in association with the stored Flow ID, and d) uses the result value to determine how to output the packet from the host server device.

2. The system of host server devices of claim 1, further comprising:
a central controller that controls an adding of Flow IDs into the exact-match flow table of each of the host server devices of the system, and that controls a deleting of Flow IDs from the exact-match flow table of each of the host server devices of the system.

3. The system of host server devices of claim 2, wherein the central controller is directly coupled via at least one networking cable to at least one host server device of the system.

4. The system of host server devices of claim 2, wherein the central controller controls how each of the host server devices determines a Flow ID from a packet.

5. The system of host server devices of claim 1, wherein none of the host server devices of the majority of host server devices includes any optical transceiver for driving any optical networking cable, and wherein each and every networking cable that is plugged into a cable socket port of any of the host server devices of the majority of host server devices is a non-optical networking cable of a length not more than one meter.

6. The system of host server devices of claim 1, wherein at least four of the columns is a column of more than ten host server devices, and wherein the system comprises at least four columns of host server devices.

7. The system of host server devices of claim 1, wherein each of the host server devices of the system can: A) receive a packet via a cable, B) determine a Flow ID from the packet, C) use the determined Flow ID to perform an exact-match lookup, and D) output the packet from the host server device via a networking cable based on a result of the exact-match lookup, wherein A) through D) occur without any lookup being performed in any flow lookup table that contains a flow entry having a wildcard identifier, and without the packet being communicated to the host processor of the host server device.

8. The system of host server devices of claim 1, wherein there is a first rack on one end of the row of racks, wherein there is a last rack on an opposite end of the row of racks, and wherein a host server device disposed in the first rack is coupled by an optical networking cable to one of the host server devices disposed in the last rack.

9. The system of host server devices of claim 1, wherein each column of host server devices includes a top-most host server device and a bottom-most host server device, wherein the top-most host server device of at least one of the columns is coupled by an optical networking cable to the bottom-most host server device of the same column.

10. The system of host server devices of claim 1, wherein substantially all of the cables of the system that directly couple two host servers devices together and that are less than one meter long are non-optical networking cables, and wherein substantially all of the cables of the system that directly couple two host servers devices together and that are more than seven meters long are optical networking cables.

11. The system of host server devices of claim 1, wherein the exact-match packet switching integrated circuit includes no processor that performs software processing on a packet header and thereby generates a Flow Identifier (Flow ID).

12. The system of host server devices of claim 1, wherein each host server device of the majority of the host server devices includes four and no more than four networking cable sockets.

13. The system of host server devices of claim 1, wherein a first host server device of the system can add a command header onto a packet and can output the packet to second host server device of the system such that the second host server device uses the command header to determine how to forward the packet on to a third host server device without having to perform any lookup operation.

14. The system of claim 1, wherein the SRAM of the exact-match flow table structure of each host server device of the majority of host server devices stores a plurality of flow entries, wherein each stored flow entry comprises a Flow ID and a result value.

15. The system of claim 14, wherein the result value indicates a port from which said each host server device will output a packet.

16. A two-dimensional array of interconnected host server devices disposed in a row of side-by-side racks, wherein each of the host server devices includes a host processor and an exact-match packet switching integrated circuit, wherein the exact-match packet switching integrated circuit includes an exact-match flow table structure, wherein each of the host server devices is coupled to at least four other of the host server devices by networking cables, and each host server device of a majority of the host server devices is coupled: by a first non-optical cable to a first other host server device in a rack to one side of said each host server device, by a second non-optical cable to a second other host server device in a rack to an opposite side of said each host server device, by a third non-optical cable to a third other host server device above said each host server device, and by a fourth non-optical cable to a fourth other host server device below said each host server device, wherein substantially all of the networking cables of the array that are more than X meters in length are optical networking cables, and wherein substantially all of the networking cables of the array that are that Y meters or less in length are non-optical networking cables, wherein the value X is about seven, and wherein the value Y is about one, wherein any of the host server devices of the array can: A) receive a packet via a networking cable, generate a Flow ID from the packet, B) use the generated Flow ID to perform lookup operation using the exact-match flow table structure to find a Flow ID stored in the exact-match flow table structure that is a bit-for-bit exact match for the determined Flow ID and thereby to obtain a result value that is stored in association with the stored Flow ID, and C) use the result value to determine which output port of the host server device it is that the packet will be output from, wherein none of the exact-match packet switching integrated circuits of the array stores any flow entry that contains any wildcard identifier.

17. A system of host server devices, comprising:
a plurality of host server devices disposed in a two-dimensional matrix of rows and columns in one or more racks, wherein every one of the host server devices is coupled to at least one other of the host server devices by a networking cable, wherein each host server device of a majority of the host server devices is coupled: by a first non-optical cable to a first other host server device in a column to one side of said each host server device, by a second non-optical cable to a second other host server device in a column to an opposite side of said each host server device, by a third non-optical cable to a third other host server device above said each host server device, and by a fourth non-optical cable to a fourth other host server device below said each host server device, wherein said each host server device is not coupled to any of the other host server devices by any optical cable, and wherein said each host server device of the majority of host server devices includes: 1) a host processor, and 2) an exact-match packet switching integrated circuit that is identical to the exact-match packet switching integrated circuit of each of the other host server devices of the majority of host server devices, 3) a first cable socket port that is coupled to a first non-optical cable, 4) a second cable socket port that is coupled to a second non-optical cable, 5) a third cable socket port that is coupled to a third non-optical cable, 6) a fourth cable socket port that is coupled to a fourth non-optical cable, wherein the exact-match packet switching integrated circuit comprises an exact-match flow table structure, wherein the exact-match flow table structure comprises a Static Random Access Memory (SRAM), wherein the SRAM stores an exact-match flow table, wherein the exact-match flow table stores flow identifiers (Flow IDs), wherein the exact-match flow table structure does not store a Flow ID that includes any wildcard identifier, wherein said each host server device: a) receives a packet via one of its first through fourth cable socket ports, b) determines a Flow ID from the packet, c) uses the determined Flow ID to perform a lookup operation using the exact-match flow table structure to find a Flow ID stored in the exact-match flow table structure that is a bit-for-bit exact match for the determined Flow ID and thereby to obtain a result value that is stored in association with the stored Flow ID, and d) uses the result value to determine how to output the packet from the host server device.

18. The system of claim 17, wherein the system comprises at least four columns of host server devices.

19. The system of claim 17, wherein each column of host server devices includes a top-most host server device and a bottom-most host server device, wherein the top-most host server device of at least one of the columns is coupled by an optical networking cable to the bottom-most host server device of the same column.

20. The system of claim 17, wherein the system further comprises a central controller that controls an adding of Flow IDs into the exact-match flow table of each of the host server devices of the system, and that controls a deleting of Flow IDs into the exact-match flow table of each of the host server devices of the system, and that controls how each of the host server devices determines a Flow ID from a packet.

* * * * *